United States Patent
Caissy

(10) Patent No.: US 9,966,044 B2
(45) Date of Patent: *May 8, 2018

(54) METHOD FOR CONTROLLING THE DISPLAY OF A PORTABLE COMPUTING DEVICE

(71) Applicant: Dave Caissy, Deux-Montagnes (CA)

(72) Inventor: Dave Caissy, Deux-Montagnes (CA)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/571,255

(22) Filed: Dec. 15, 2014

(65) Prior Publication Data

US 2016/0171659 A1 Jun. 16, 2016

(51) Int. Cl.
*G09G 5/32* (2006.01)
*G06T 11/60* (2006.01)

(52) U.S. Cl.
CPC ............... *G09G 5/32* (2013.01); *G06T 11/60* (2013.01); *G09G 2340/0492* (2013.01); *G09G 2354/00* (2013.01); *G09G 2380/14* (2013.01)

(58) Field of Classification Search
CPC ................................ G06T 3/60; G06F 3/0338
See application file for complete search history.

(56) References Cited

U.S. PATENT DOCUMENTS

| | | | |
|---|---|---|---|
| 7,979,785 B1 * | 7/2011 | Wang ................ | G06F 17/30905 715/200 |
| 2010/0278453 A1 * | 11/2010 | King ..................... | G06Q 10/10 382/321 |
| 2012/0233565 A1 * | 9/2012 | Grant ................... | G06F 3/04817 715/776 |
| 2013/0073932 A1 * | 3/2013 | Migos ................. | G06F 15/0291 715/201 |
| 2015/0177933 A1 * | 6/2015 | Cueto ................... | G06F 3/0483 715/776 |

* cited by examiner

*Primary Examiner* — Kee M Tung
*Assistant Examiner* — Yanna Wu
(74) *Attorney, Agent, or Firm* — Marshall, Gerstein & Borun LLP

(57) ABSTRACT

The present document describes a method for controlling an output presented on a visual display of a portable computing device having an orientation, the portable computing device comprising a memory on which is stored visual content comprising at least one of graphics data, photo data and video data, and text content substantially comprising text data, the text content further comprising a visual content indicator indicative of the existence of the visual content, the method comprising: detecting the orientation of the portable computing device as corresponding to one of a first display mode and a second display mode; in the orientation corresponding to the first display mode, presenting the text content on the visual display in the first display mode; in the presence of the visual content indicator, detecting a change of the orientation corresponding to the first display mode to the orientation corresponding to the second display mode; and in the orientation corresponding to the second display mode, presenting the visual content in the second display mode on the visual display.

18 Claims, 37 Drawing Sheets

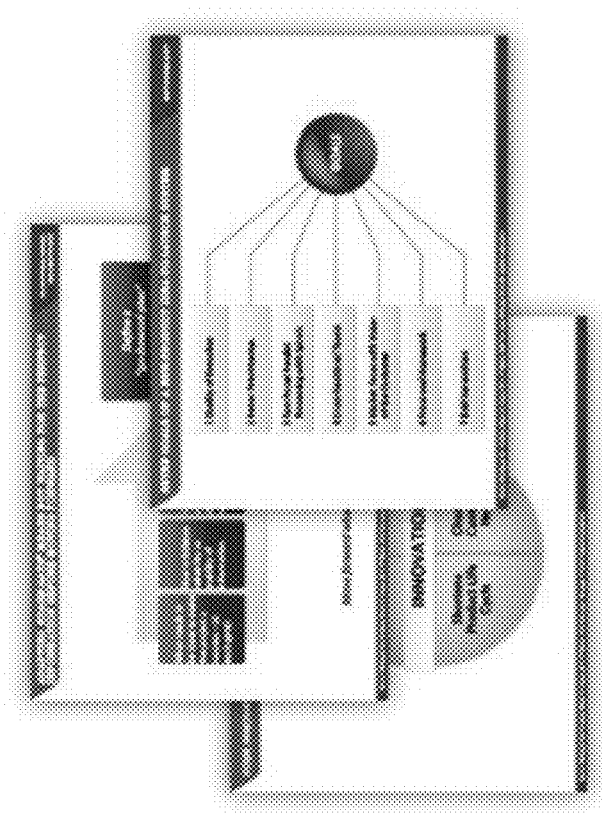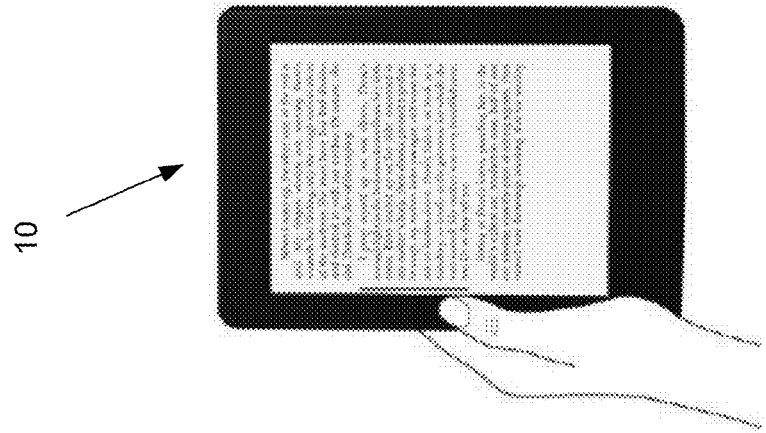
Fig. 15

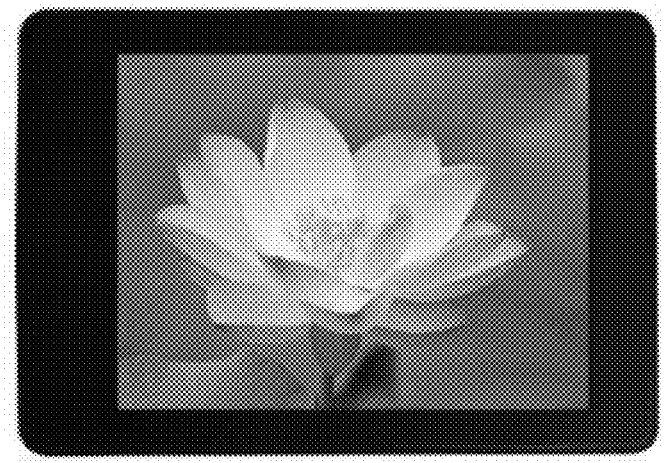
*Step 1: Look at the visual content*
10
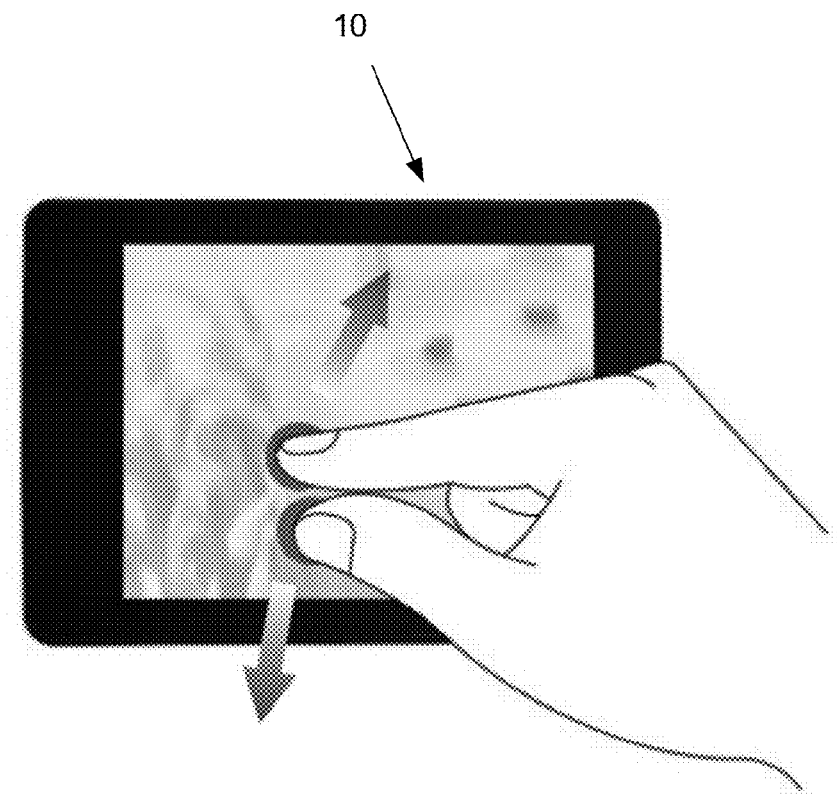
*Step 2: Use finger to zoom or unzoom*
Fig. 31

METHOD FOR CONTROLLING THE DISPLAY OF A PORTABLE COMPUTING DEVICE

CROSS-REFERENCE TO RELATED APPLICATION

This application claims priority of U.S. Provisional Application No. 61/757,406, filed on Jan. 28, 2014, the specification of which is hereby incorporated herein by reference in its entirety.

BACKGROUND (a) Field

The subject matter disclosed generally relates to methods for controlling display of portable computing devices and to portable computing devices controlling an output presented on a visual display.

(b) Related Prior Art

A tablet computer (i.e., an iPad for example) is a one-piece mobile computer, primarily operated by touchscreen (i.e., the user's finger essentially functions as the mouse and cursor, removing the need for the physical (i.e., mouse and keyboard) hardware components necessary for a desktop or laptop computer, and an onscreen, hideable virtual keyboard is integrated into the display).

As of March 2012, 31% of U.S. Internet users were reported to have a tablet, which was used mainly for viewing published content such as video and news. Portable computing device using touch screen functions are very popular these days.

Typical functions of portable computing devices are: high definition displays with anti-glare technology; wireless mobile browser functions (using 2G, 3G, 4G or WiFi); e-mail and social media devices (typically with integration apps to bring all feeds into the same view); potential cell phone functions (messaging, video calling, speakerphone or headset cell phone uses); video-teleconferencing (Skype, FaceTime, etc.), GPS satellite navigation, stills and video camera functions, photo and video viewing and editing, eBook reading and the ability to subscribe to and read daily/weekly/monthly/annual magazines, newspapers, or other periodicals, read interactive and traditional graphic novels and comic books; downloadable apps (games, education, utilities); portable media player function including the ability to watch video (both streaming and locally stored); academic readings and the like.

There is therefore a need for improved methods for controlling display of portable computing devices and for portable computing devices controlling an output presented on a visual display.

SUMMARY

According to an embodiment, there is provided a method for controlling an output presented on a visual display of a portable computing device having an orientation, the portable computing device comprising a memory on which is stored visual content comprising at least one of graphics data, photo data and video data, and text content substantially comprising text data, the text content further comprising a visual content indicator indicative of the existence of the visual content, the method comprising: detecting the orientation of the portable computing device as corresponding to one of a first display mode and a second display mode; in the orientation corresponding to the first display mode, presenting the text content on the visual display in the first display mode; in the presence of the visual content indicator, detecting a change of the orientation corresponding to the first display mode to the orientation corresponding to the second display mode; and in the orientation corresponding to the second display mode, presenting the visual content in the second display mode on the visual display.

According to another embodiment, the detecting the orientation as corresponding to one of a first display mode and a second display mode comprises detecting the orientation as corresponding to one of a portrait mode and a landscape mode, respectively.

According to another embodiment, there is further provided, in the orientation corresponding to the second display mode, detecting the change of the orientation corresponding to the first display mode to the orientation corresponding to the second display mode, for presenting the text content on the visual display in the first display mode.

According to another embodiment, there is further provided, in the orientation corresponding to the first display mode, selecting the visual content indicator for triggering a display of the visual content on the visual display, the selecting comprising at least one of clicking and tapping on the visual content indicator presented on the visual display.

According to another embodiment, the presenting a text content comprising a visual content indicator comprises presenting a text content comprising a plurality of visual content indicators indicative of the existence of a corresponding plurality of visual contents, and wherein detecting the change of the orientation in the presence of a visual indicator comprises detecting the change of the orientation in the presence of the plurality of visual content indicators, and wherein presenting the visual content in the second display mode comprises presenting one of the plurality of the visual contents.

According to another embodiment, there is further provided, in the orientation corresponding to the second display mode, swiping the visual display for introducing a panel comprising the text content for displaying both the text content and the visual content on the visual display.

According to another embodiment, presenting a text content on the visual display comprises presenting a text content comprising a table of contents on the visual display, the table of contents comprising a visual indicator indicative of the existence of visual content.

According to another embodiment, there is further provided, after presenting the visual content, detecting a swipe on the visual display for navigating between a plurality of visual contents.

According to another embodiment, there is further provided, in the orientation corresponding to the second display mode in which a given visual content is displayed, detecting the change of the orientation corresponding to the first display mode to the orientation corresponding to the second display mode, for presenting on the visual display, in the first display mode, the text content which corresponds to the given visual content.

According to another embodiment, there is further provided generating a count of each change of the orientation corresponding to the first display mode to the orientation corresponding to the second display mode, and at least one of: storing the count on the memory and sending the count to a remote server via a communication network.

According to another embodiment, there is further provided determining a payment based on the count.

In another aspect of the invention, there is provided a portable computing device for controlling an output presented on a visual display, the portable computing device comprising: a visual display presenting an output; a detector for detecting an orientation of the portable computing device, the orientation corresponding to one of a first display mode and a second display mode; a processing device in communication with the visual display and the detector; a memory for storing: visual content comprising at least one of graphics data, photo data and video data, and text content substantially comprising text data, the text content further comprising a visual content indicator indicative of the existence of the visual content; and instructions which cause the processing device: to detect the orientation of the portable computing device as corresponding to one of the first display mode and the second display mode; in the orientation corresponding to the first display mode, to present the text content on the visual display in the first display mode; in the presence of the visual content indicator, to detect a change of the orientation corresponding to the first display mode to the orientation corresponding to the second display mode; and in the orientation corresponding to the second display mode, to present the visual content in the first display mode on the visual display.

According to another embodiment, the detector for detecting an orientation corresponding to one of a first display mode and a second display mode comprises a detector for detecting an orientation corresponding to one of a portrait mode and a landscape mode.

According to another embodiment, the memory is further for storing instructions which cause the processing device to, in the orientation corresponding to the first display mode and upon a swipe on the visual display, display a panel comprising the text content for displaying both the text content and the visual content on the visual display.

In another aspect of the invention, there is provided an interactive application for controlling an output presented on a visual display of a portable computing device comprising a memory, the interactive application comprising: a detection module for detecting an orientation of the portable computing device, the orientation corresponding to one of a first display mode and a second display mode; a text content substantially comprising text data for display when the orientation corresponds to the first display mode; a visual content indicator presented within the text content, the visual content indicator being indicative of the existence of visual content comprising at least one of graphics data, photo data and video data; the visual content presented when the detection module detects that the orientation corresponding to the first display mode changes to the orientation corresponding to the second display mode in presence of the visual content indicator, wherein the text content, the visual content indicator and the visual content are stored on the memory.

According to another embodiment, the detection module for detecting an orientation corresponding to one of a first display mode and a second display mode comprises a detection module for detecting an orientation being one of a portrait mode and a landscape mode, respectively.

According to another embodiment, the text content is an electronic book.

According to another embodiment, the text content further comprises a table of contents, the table of contents comprising the visual indicator indicative of the existence of the visual content.

According to another embodiment, there is further provided, when the orientation is detected to correspond to the first display mode, a panel comprising the text content for displaying both the text content and the visual content on the visual display.

According to another embodiment, the visual indicator comprises a plurality of visual indicators indicative of the existence of a corresponding plurality of visual contents, and wherein the detection module for displaying the visual content comprises a detection module for displaying one of the visual contents which corresponds to one of the plurality of visual indicators.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which:

FIGS. 4 to 37 are illustrations showing a visual display of a portable computing device in accordance with various embodiments.

It will be noted that throughout the appended drawings, like features are identified by like reference numerals.

DETAILED DESCRIPTION

Figure 1:
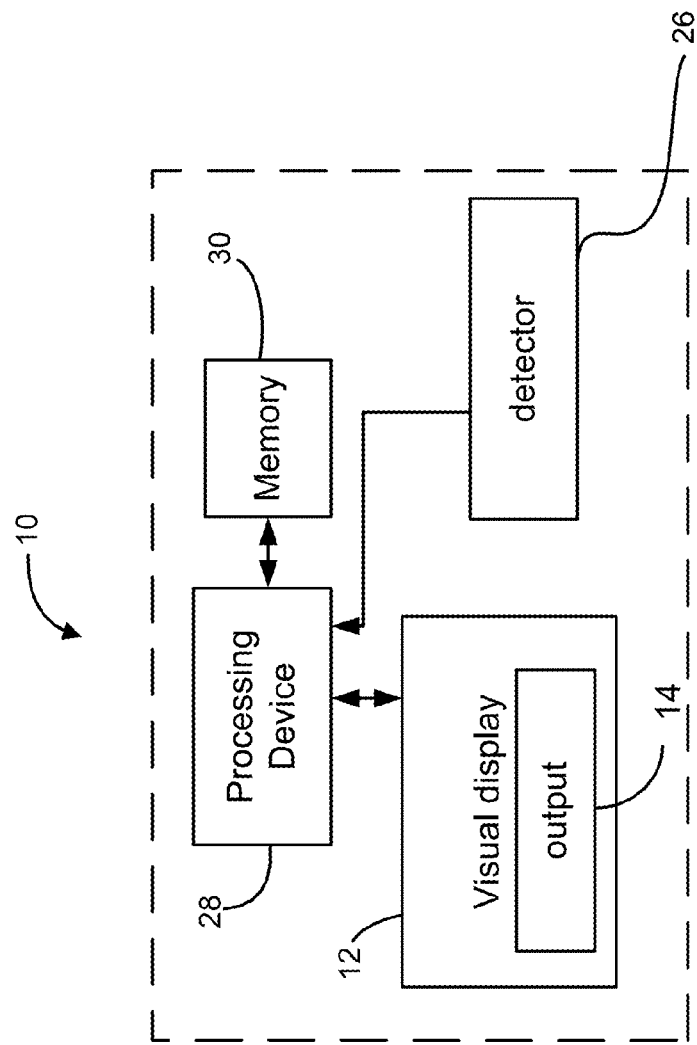
FIG. 1 is a block diagram of a portable computing device for controlling an output presented on a visual display in accordance with an embodiment.

In embodiments presented herein there are disclosed methods for controlling display of portable computing devices and to portable computing devices controlling an output presented on a visual display Referring now to the drawings, and more particularly to FIG. 1, there is shown a block diagram of a portable computing device 10 for controlling an output 14 presented on a visual display 12. The portable computing device 10 includes a visual display 12 presenting an output 14 and a detector 26 for detecting an orientation of the portable computing device 10. The detector 26 may comprise an accelerometer. The orientation may be one of a portrait mode 16 and a landscape mode 18 or one of a substantially horizontal mode and a substantially vertical mode. The portable computing device 10 also includes a processing device 28 which is in communication with the visual display 12 and the detector 26. The portable computing device 10 further includes a memory 30 for storing instructions which cause the processing device 28: to detect the orientation of the portable computing device 10 as being one of the portrait mode 16 and the landscape mode 18; in the portrait mode 16, to present a text content 20 on the visual display 12, the text content 20 substantially comprising text data, the text content 20 further comprising a visual content 24 indicator 22 indicative of the existence of visual content 24 comprising at least one of graphics data, photo data and video data; in the presence of the visual indicator, to rotate the portable computing device 10 to the landscape mode 18; and in the landscape mode 18, to present the visual content 24 on the visual display 12.

Typical examples of a portable computing device 10 include electronic readers, smartphones, tablets, phablets and, more widely, may also refer to cell phones, portable music players and other handheld electronic devices. However, given the pace of technological advancements in this field, the terms "portable computing device" may embrace new technologies that do not exist now but in which the method described herein can be implemented as in existing portable computing devices. These new portable computing devices should be considered as possible variants of the portable computing device 10 described herein.

The memory 30 for storing instructions can be an optical memory, a magnetic memory, or other types of memories known in computer engineering to store instructions and data. The instructions stored on the memory usually include routines, programs, objects, components, data structures, etc., that perform particular tasks or implement particular abstract data types and cause other parts of the computing environment to interact (communication, data exchange) together.

The processing device 28 is an electronic device configured for performing calculations, executing tasks with respect to the instructions that are received and more generally, perform logical operations.

The visual display 12 for presenting an output 14 may comprise what is commonly called a screen. The screen can be of various types depending on the underlying technology. Some types of screen include emitting light (smartphones, tablets) whereas others do not (such as readers). Many portable devices comprise a touch-sensitive screen, although the method described herein can be implemented in a device in which this feature is absent.

The processing device 28, the memory 30, the detector 26 and the visual display 12 can be operatively connected through a system bus or any other type of communication channel known in computer engineering to transmit electric, magnetic or optical information between the components of a computing device. In an embodiment, one (or more) component is external to the portable computing device 10 and communicates with the other components using an electrical connection or a wireless communication. For example, the memory 30 may be a flash memory which is external to the portable electronic device 10 but electrically connected thereto.

The detector 26 is configured for detecting an orientation of the portable computing device 10. In most prior art devices, when the orientation is detected as being mostly vertical, the visual display 12 a mode called portrait mode. Similarly, when the orientation is detected as being mostly horizontal, the visual display 12 a mode called landscape mode. This aims to present information (text data, pictures, etc.) in an orientation that is more comfortable for the user in both cases. In that sense, an orientation of the portable computing device may be considered as corresponding to a given display mode (portrait/substantially vertical and landscape/substantially horizontal).

In an embodiment of the present invention, when the orientation corresponds to a first display mode (which can be portrait, landscape, substantially vertical or substantially horizontal), instructions on the memory 30 are sent to present a text content 20 on the visual display 12, the text content 20 substantially comprising text data, the text content 20 further comprising a visual content indicator 22 which indicates that visual content 24 exists. When the portable electronic device is sufficiently rotated so that the detected orientation corresponds to a second display mode (preferably the mode which is complementary to the first display mode, for example for passing from the portrait to the landscape mode), the change of orientation triggers the display of the visual content 24 on the visual display 12, in accordance with instructions stored on the memory 30 which are sent to perform this task. Whereas prior art devices display the same text data in two orientations as the display mode changes, an embodiment of the portable electronic device 10 displays text data (comprising a visual indicator 22) in an orientation and the visual content 24 that corresponds to the visual indicator 22 in the other orientation. Various exemplary representations of the visual display 12 are illustrated in FIGS. 4-37 and described below.

According to an embodiment, the text content 20 (comprising text data and visual content indicators 22) and the visual content 24 are both already downloaded and stored on the memory 30. Therefore, upon a rotation of the portable electronic device 10 in the presence of a visual content indicator 22, when loading the visual content which is to be displayed in the recently changed orientation, no network connection is required. It means that no internet connection is needed to download the visual content, since it is already pre-downloaded on the memory 30 of the portable computing device 10. This feature allows the display of the visual content 24 when no connection with a communication network is established, like in the metro, in underground facilities, in remote places or simply when the user of the portable computing device has no internet package with a network provider. Of course, if a network connection is available, new content can be downloaded.

Figure 2:
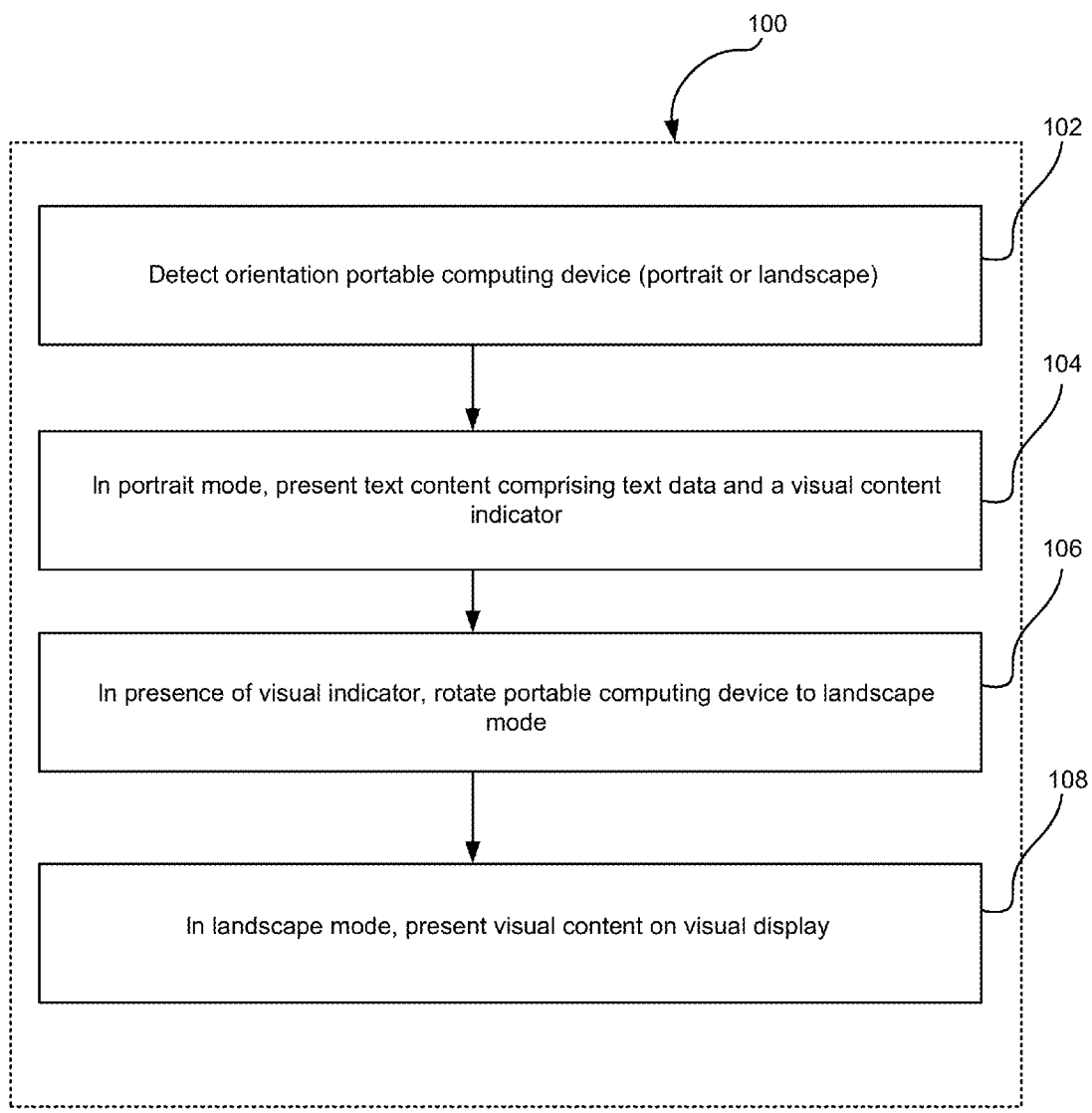
FIG. 2 is a flow chart of a method for controlling the output presented on a visual display of a portable computing device in accordance with another embodiment.

According to another embodiment and referring now to FIG. 2, there is shown a method 100 for controlling the output 14 presented on a visual display 12 of a portable computing device 10. The method 100 includes a step 102 of detecting the orientation of the portable computing device 10 as being one of a portrait mode 16 and a landscape mode 18 and the step 104 of, in the portrait mode 16, presenting a text content 20 on the visual display 12, the text content 20 substantially comprising text data, the text content 20 further comprising a visual content indicator 22 indicative of the existence of visual content 24 comprising at least one of graphics data, photo data and video data. The method 100 also includes the step 106 of, in the presence of the visual indicator 22, rotating the portable computing device 10 to the landscape mode 18; and the step 108 of, in the landscape mode 18, presenting the visual content 24 on the visual display 12. As mentioned above in reference with FIG. 1, the portrait mode 16 and landscape mode 18 may be interchanged, or may also be replaced by modes that are substantially vertical and substantially horizontal.

Figure 3:
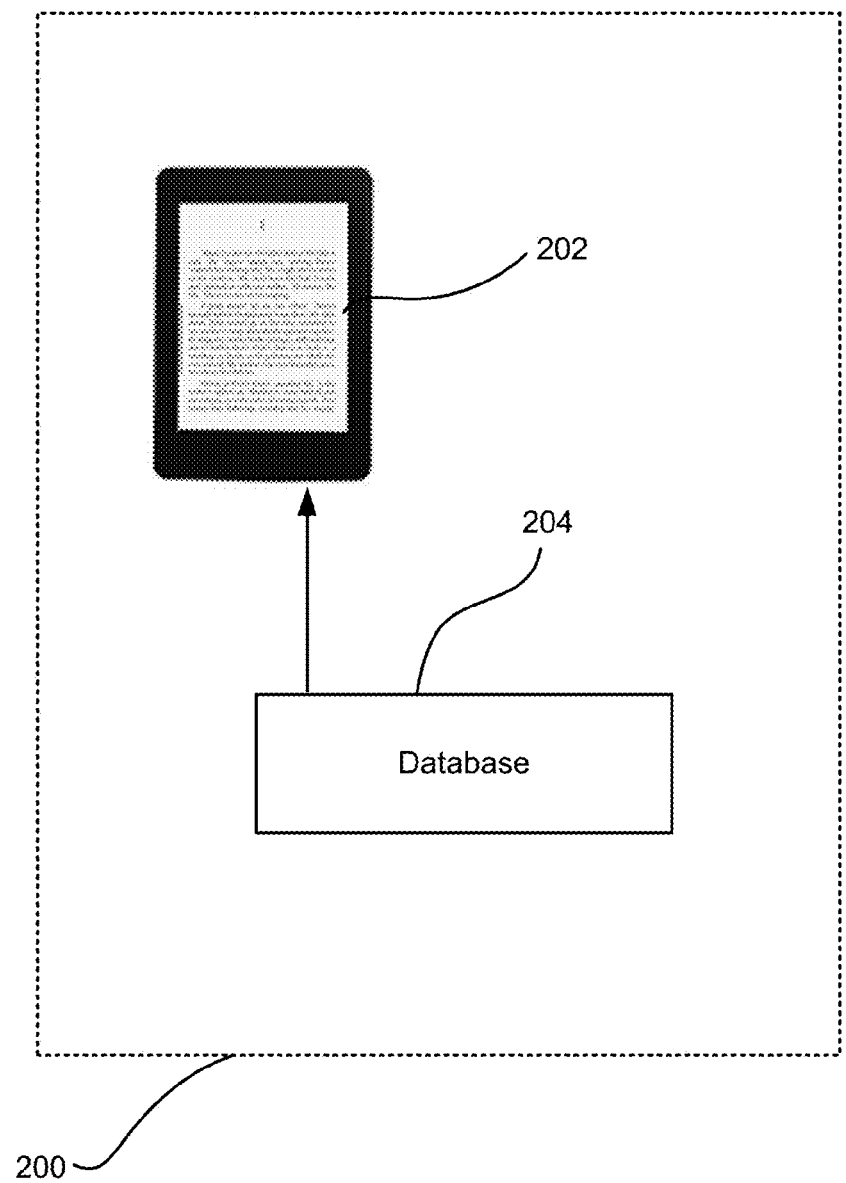
FIG. 3 is a schematic illustration of the system for controlling the output presented on a visual display of a portable computing device.

According to another embodiment and referring now to FIG. 3, there is shown a schematic illustration of the system 200 for controlling the output 14 presented on a visual display 12 of a portable computing device 10. The system 200 comprises a portable computing device 202 and a database 204 for storing the text content 20, the visual content indicator 22 of the text content 20 and the visual content indicator 22.

Figure 4:
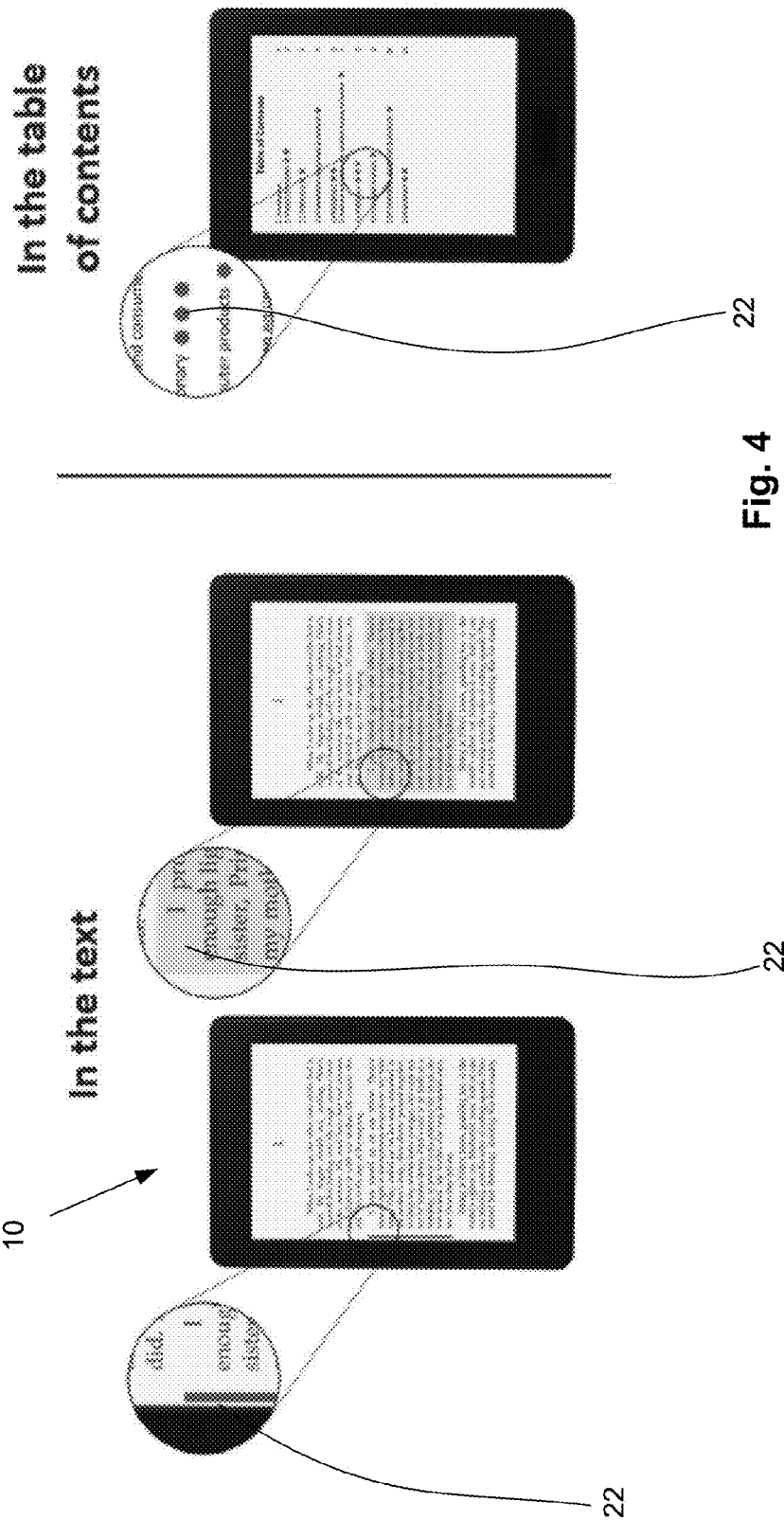

According to another embodiment and referring now to FIG. 4, there is shown a visual display 12 of the portable computing device 10. FIG. 4 illustrates the visual content indicator 22 on the text content 20. For example, the visual content indicator 22 may be a colored bar (i.e., a blue bar) on the left side of the text data of the text content 20, a color highlighted text data or an icon, such as dots in the table of contents indicative of the existence of the visual content 24. It is to be noted that any suitable visual content indicator 22 may be used to indicate the existence of the visual content 24. It is important to be mention that the orange arrowhead in the FIGS. 5-37 indicates that a transformation is taking place. This orange arrowhead does not appear on the visual display 12 of the portable computing device 10.

Figure 5:
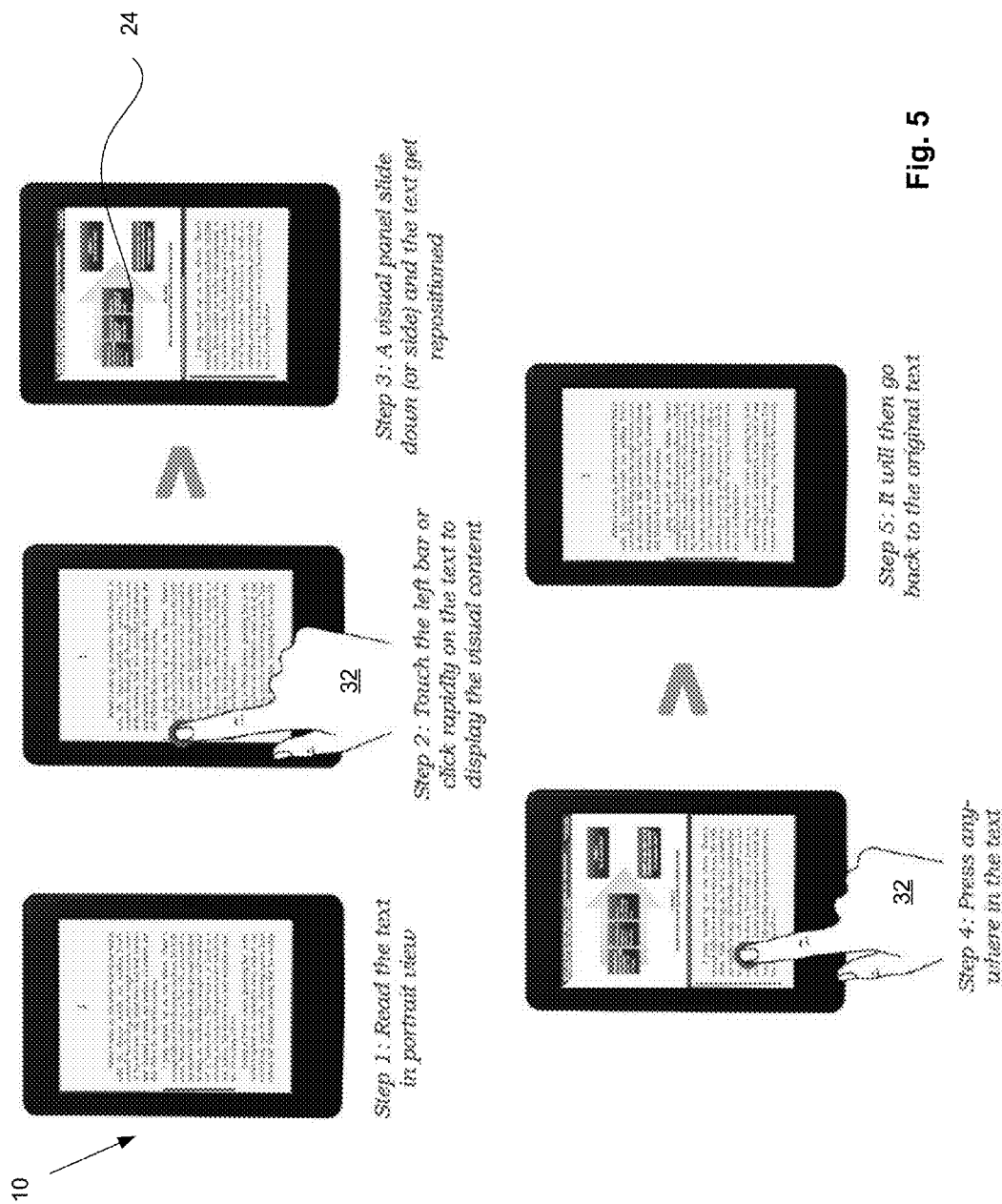

According to another embodiment and referring now to FIG. 5, there is shown a visual display 12 of the portable computing device 10. In FIG. 5, there is shown that when a blue bar is displayed on the text content 20, it is possible for a user 32 to touch on the left-end side bar to access the visual content 24 without flipping the device (i.e., without flipping the portable computing device 10 from its portrait mode 16 orientation to its landscape mode 18 orientation). As shown, as a step 1, the user 32 reads the text data in the portrait mode 16 orientation. The user 32 then touches the left bar (i.e., the visual content indicator 22) or rapidly clicks on the text data to display the visual content 24. In step 3, the user 32 can see on the visual display 12 that a visual content 24 slides down (or side) and the text data gets repositioned. It is to be noted that when there is a visual indicator on the visual display 12, user actions other than finger touch could trigger the visual content 24. For example, the voice of the user 32, or the action of pressing on a specific button of the portable computing device 10 may bring the visual content 24 on the visual display 12.

Figure 6:
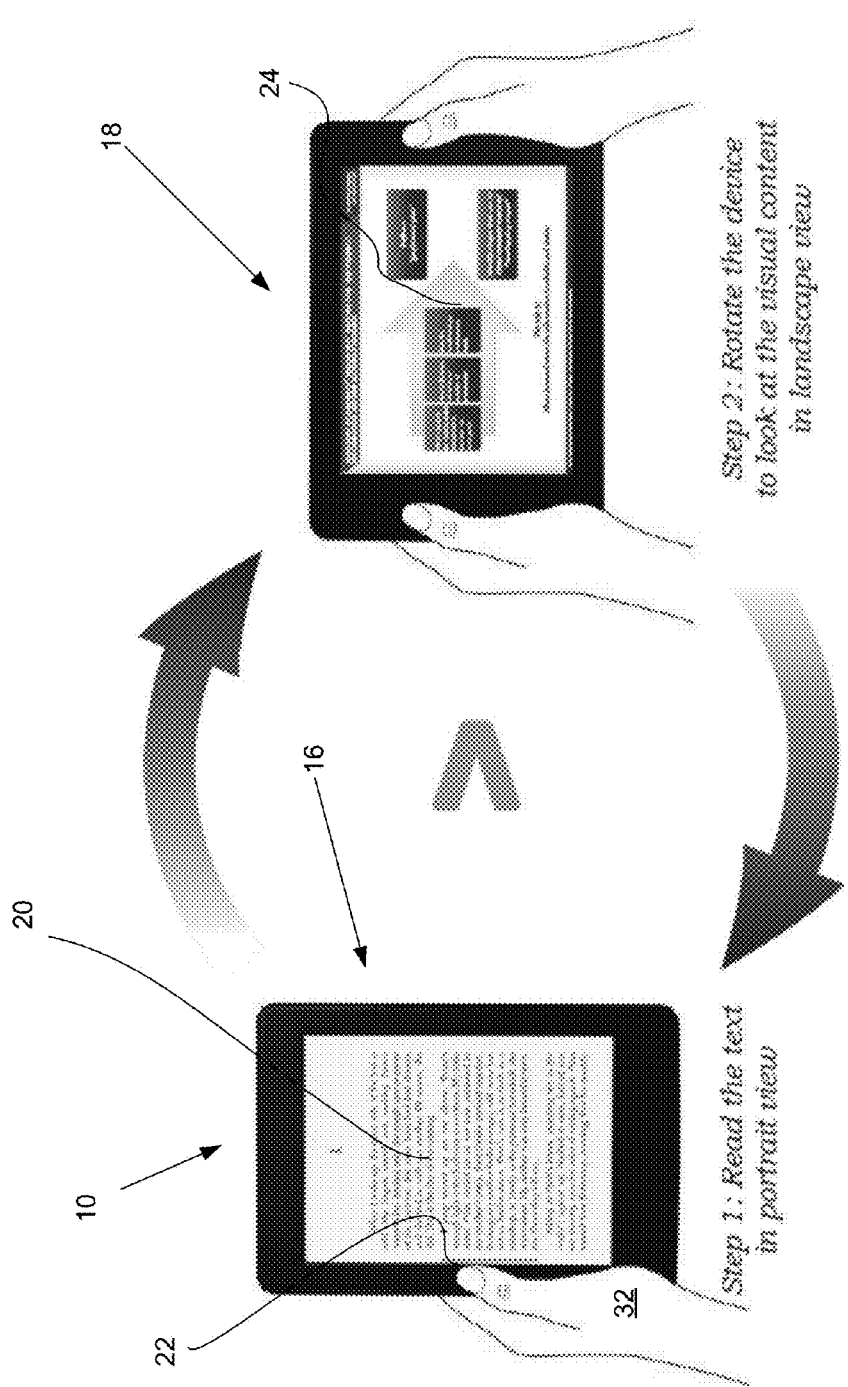

According to another embodiment and referring now to FIG. 6, there is shown a visual display 12 of the portable computing device 10. FIG. 6 shows that when the visual content indicator 22 (i.e., the blue bar) is displayed on the visual display 12, it is possible to rotate the portable computing device 10 to look at the visual content 24. In step 1, the user 32 reads the text data in the portrait mode 16 orientation. Then, in step 2, the user 32 rotates the portable computing device 10 to look at the visual content 24 in the landscape mode 18 orientation.

Figure 7:
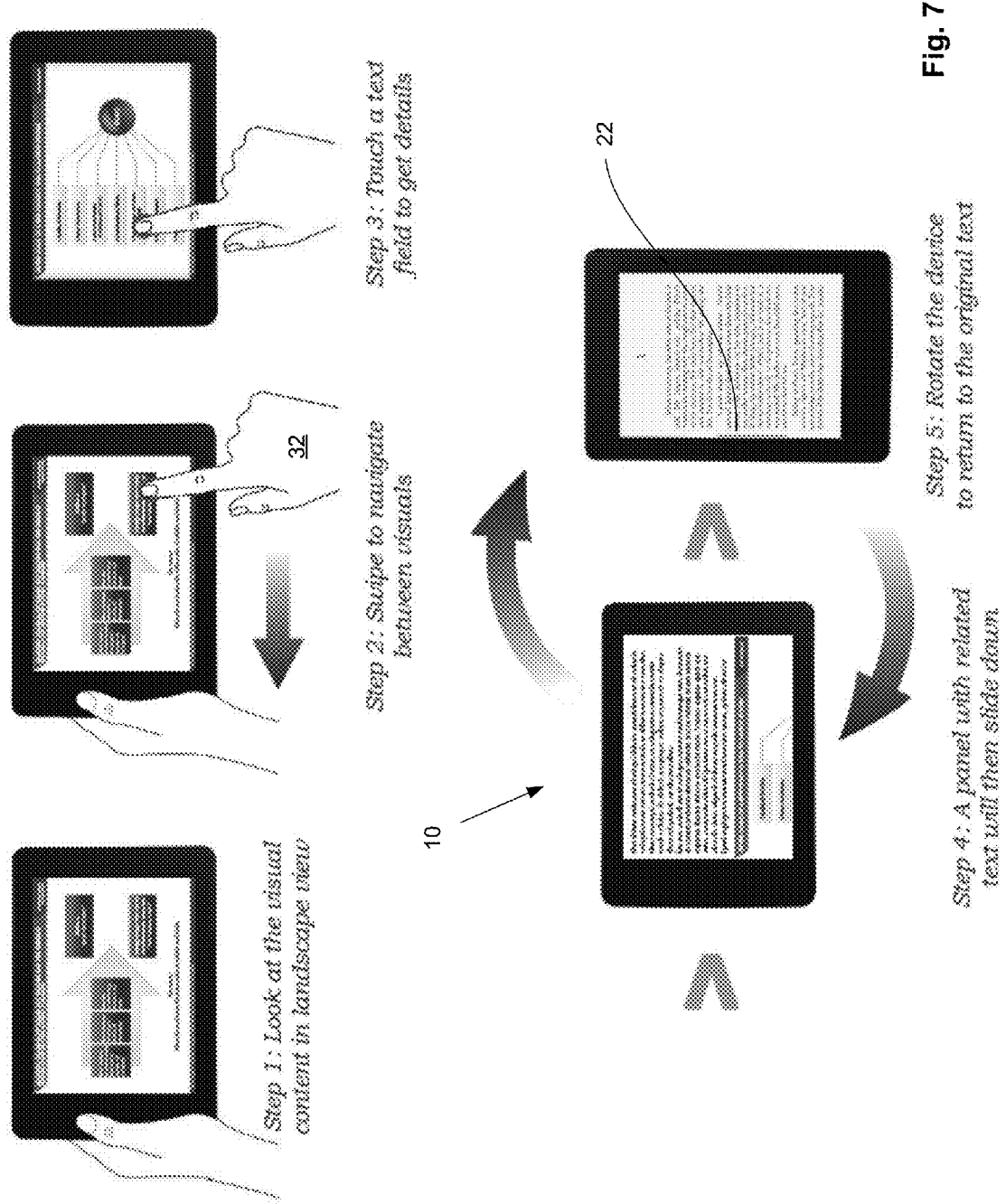

According to another embodiment and referring now to FIG. 7, there is shown a visual display 12 of the portable computing device 10. FIG. 7 shows a review of the portable computing device 10 content through its visual contents 24 simply by finger touching an element on which the user 32 wants more information. These actions may open a pop-up text for example. Whenever the user 32 wants more detailed information, he can rotate the portable computing device 10 to get access to the original text content 20. In step 1, the user 32 can look at the visual content 24 in the landscape mode 18 orientation. In step 2, the user 32 may swipe to navigate between different visual contents 24. In step 3, the user 32 decides to touch a text data (i.e., a text field) to get more details. In step 4, text content 20 with text data related to the visual content 24 will then slide down and in step 5, the user 32 rotates the portable computing device 10 to return to the original text content 20.

Figure 8:
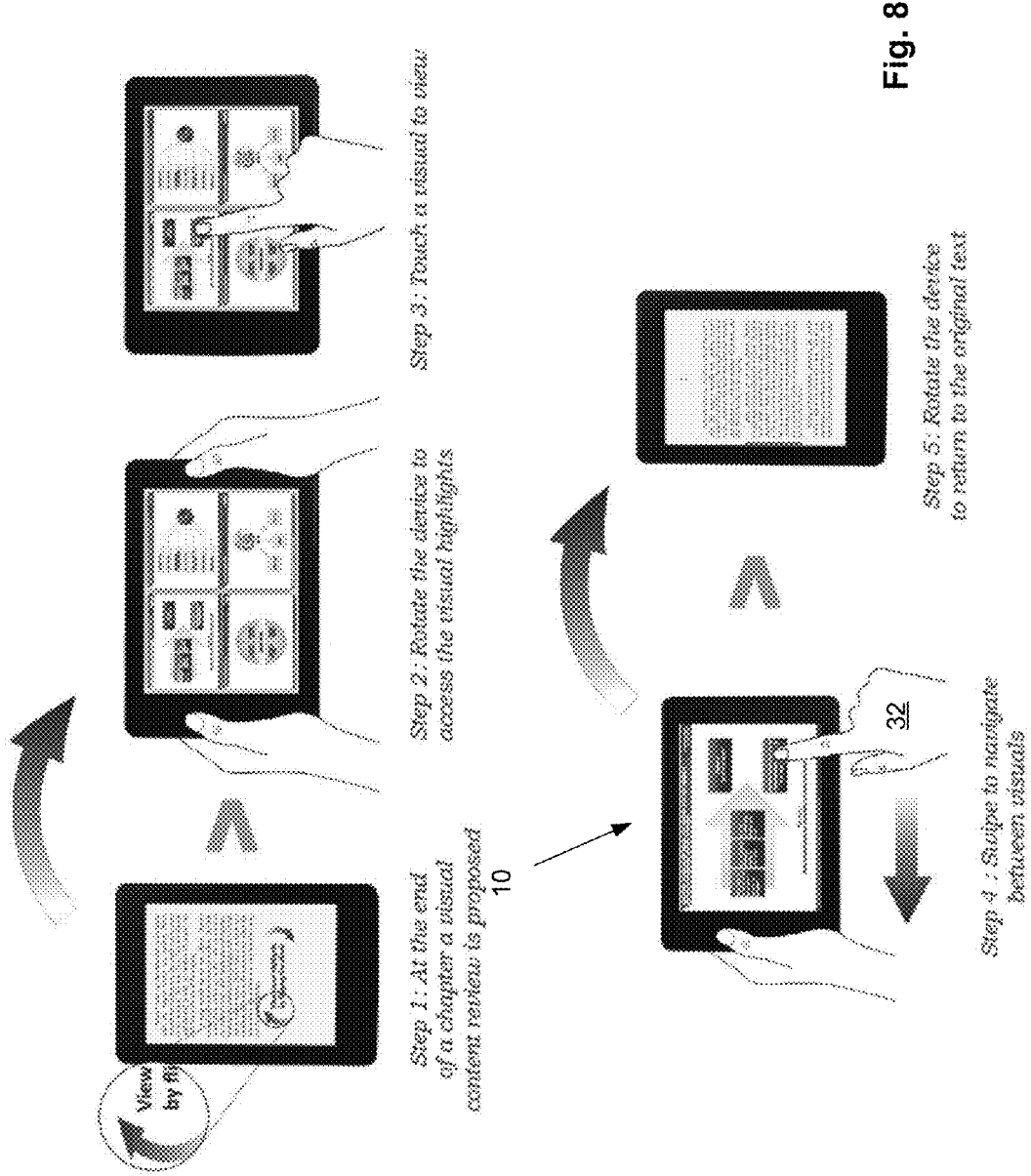

According to another embodiment and referring now to FIG. 8, there is shown a visual display 12 of the portable computing device 10. FIG. 8 illustrates an end of chapter review. Indeed, at the end of a chapter (i.e., of a book, a magazine, and the like), a review of its visual highlights is available for the user 32, by simply rotating the portable computing device 10. In step 1, there is shown that at the end of a chapter, a visual content 24 review is proposed and that in step 2, the user 32 can rotate the portable computing device 10 to access the visual content 24 highlights. In step 3, the user 32 can touch a visual content 24 to view and in step 4, it is possible for the user 32 to swipe to navigate between visual contents 24. Furthermore, in step 5, the user 32 can rotate the portable computing device 10 to return to the original text content 20.

According to an embodiment, when the user 32 first rotates the portable computing device 10, a first visual content 24 appears. After swiping to navigate between visual contents 24, the user 32 may stop navigating at a different visual content 24. When the user 32 rotates the portable computing device again to show text content 20, the part of the text content 20 that is shown is the part that corresponds to the second visual content 24.

Figure 9:
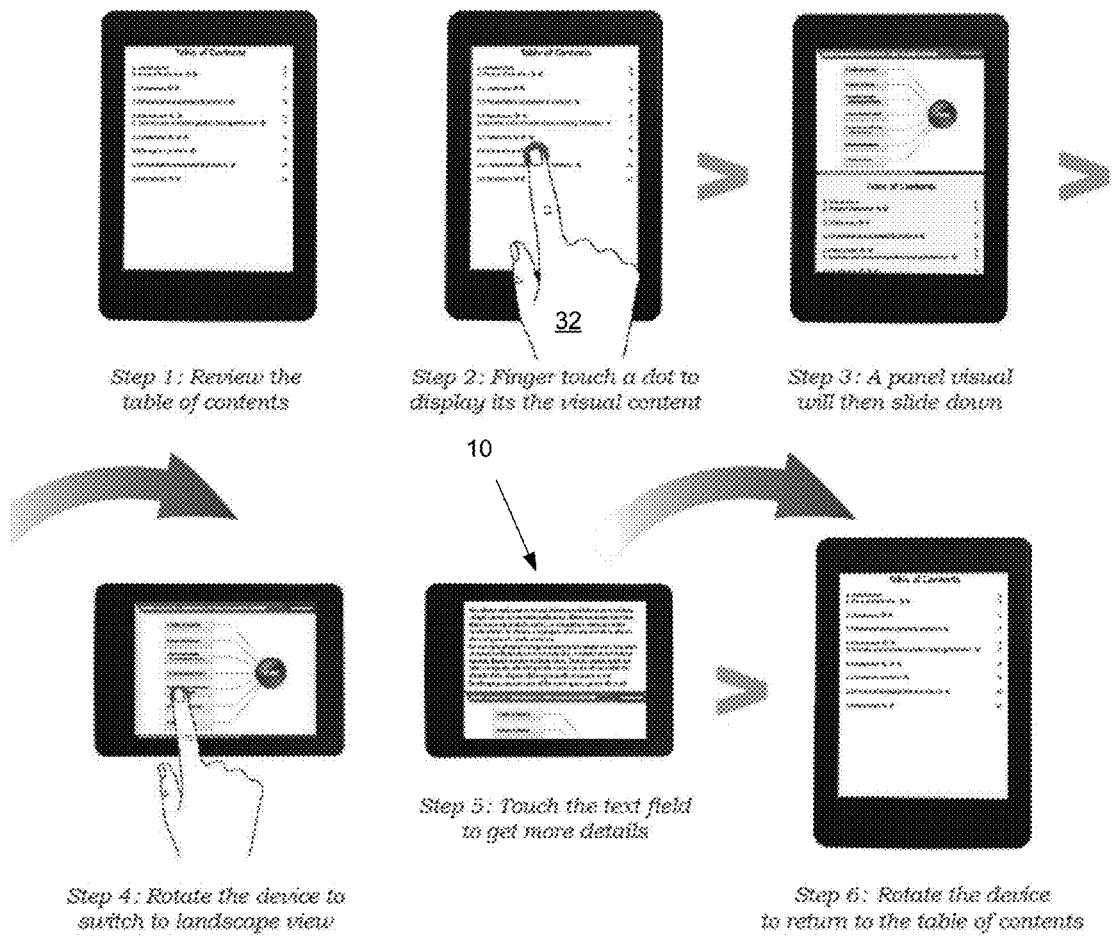

According to another embodiment and referring now to FIG. 9, there is shown a visual display 12 of the portable computing device 10. FIG. 9 illustrates a visual content 24 accessed from the table of contents in a document. In this embodiment, the existence of visual content 24 is indicated in the table of contents. Each visual content 24 has its own visual content indicator 22 (i.e., its visual bullet). In step 1, the user 32 reviews the table of contents and in step 2, the user 32 can finger touch a visual content indicator 22 (i.e., a dot or any other suitable visual content indicator 22), to display the visual content 24. In step 3, a visual content 24 then slides down and in step 4, the user 32 decides to rotate the portable computing device 10 to switch to landscape mode 18 orientation. In step 5, the user 32 touches the text content 20 to get more details and in step 6, the user 32 rotates the portable computing device 10 to return to the table of contents.

Figure 10:
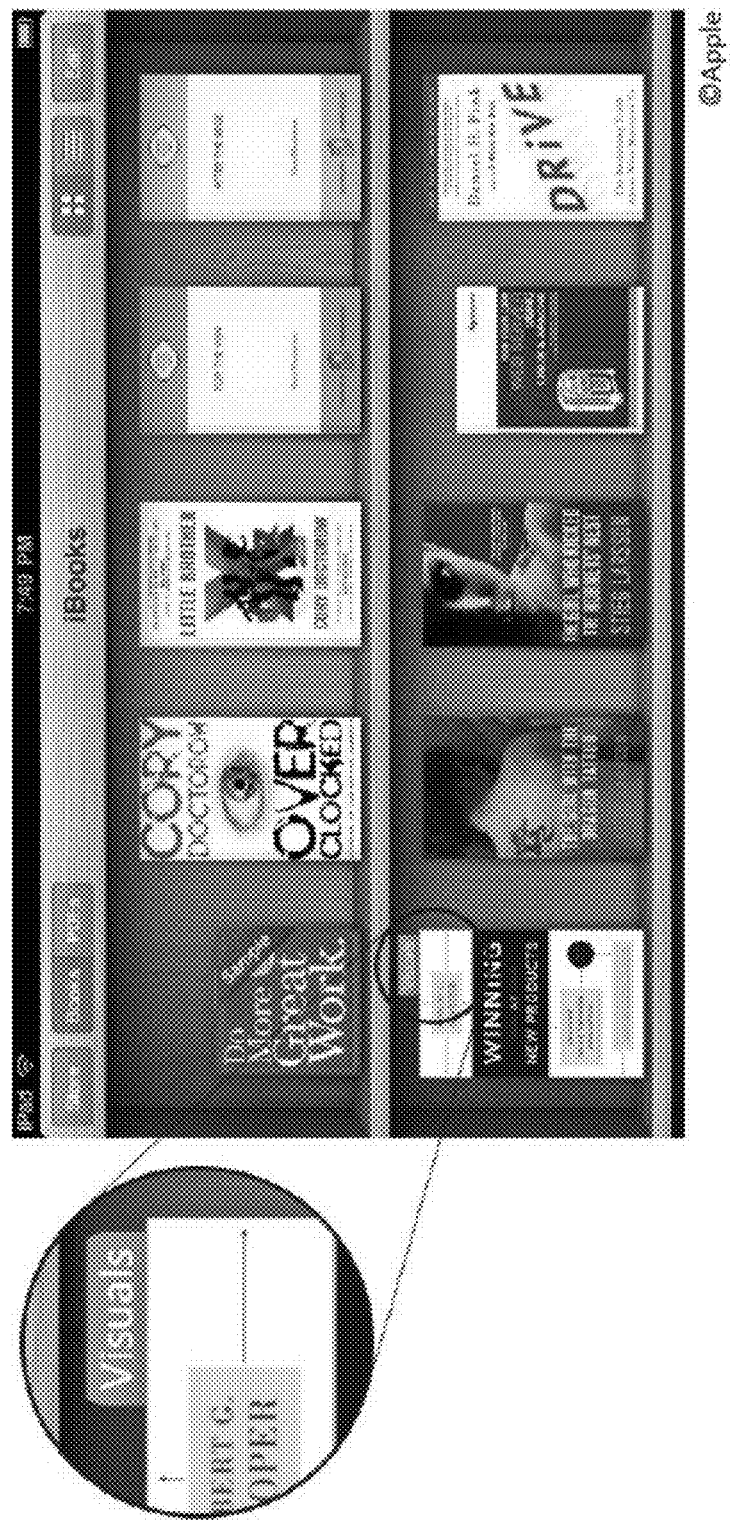
Figure 11:

According to another embodiment and referring now to FIGS. 10 and 11, there is shown a visual display 12 of the portable computing device 10. FIGS. 10 and 11 illustrate the visual display 12 of an eBook library. According to this embodiment, when an eBook with embedded visual content indicators 22 and visual contents 24 has been bought, it is indicated in the eBook library with a colored tab (i.e., an orange tab). FIG. 10 illustrates the visual display 12 of an Apple iBook Library, and FIG. 11 illustrates the visual display 12 of an Amazon Kindle Library.

According to another embodiment, the method for controlling the output 14 presented on a visual display 12 of a portable computing device 10 may be used for music needs, academic needs, news and other suitable needs which would require such a method and portable computing device 10.

Figure 12:
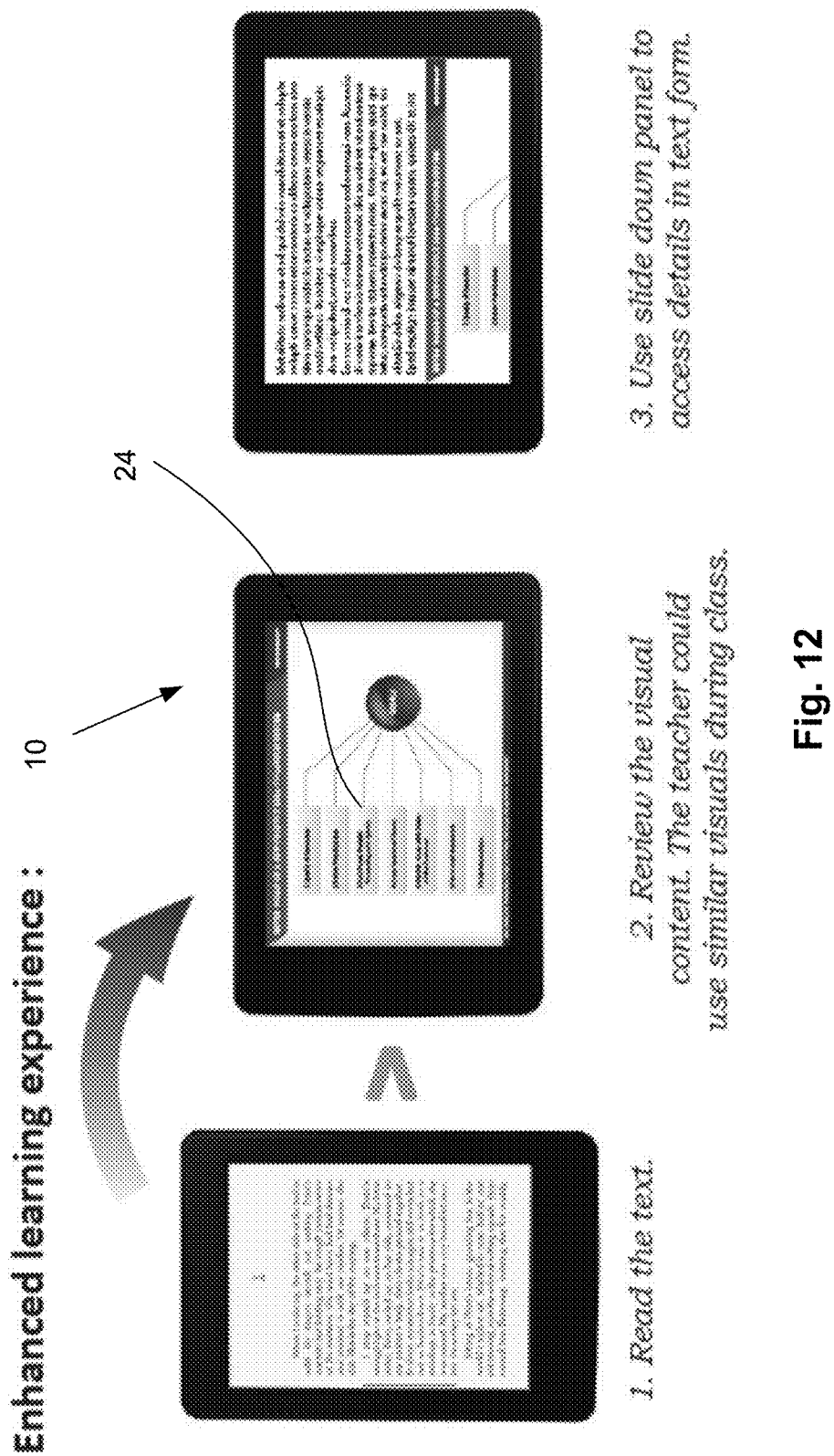

According to another embodiment and referring now to FIG. 12, there is shown a visual display 12 of the portable computing device 10. FIG. 12 illustrated academic eBooks. Indeed, the portable computing device 10 as described above may be used for academic needs. There are a plurality of benefits to use the portable computing device 10 for academic uses. It adds value to academic eBooks, it enhances the learning experience for students, it simplifies the teacher's preparation since editable visual content 24 and tools can be bought on-line, and the like. As shown in FIG. 12, in step 1, the user 32 (i.e., a teacher and/or students) can read the text content 20 and in step 2, the user 32 can review the visual content 24. The user 32 (i.e., the teacher) can use similar visual contents 24 during class. In step 3, the user 32 can use a slide down panel comprising text contents 20 to access details in the text data. This may enhance the learning experience.

Figure 13:
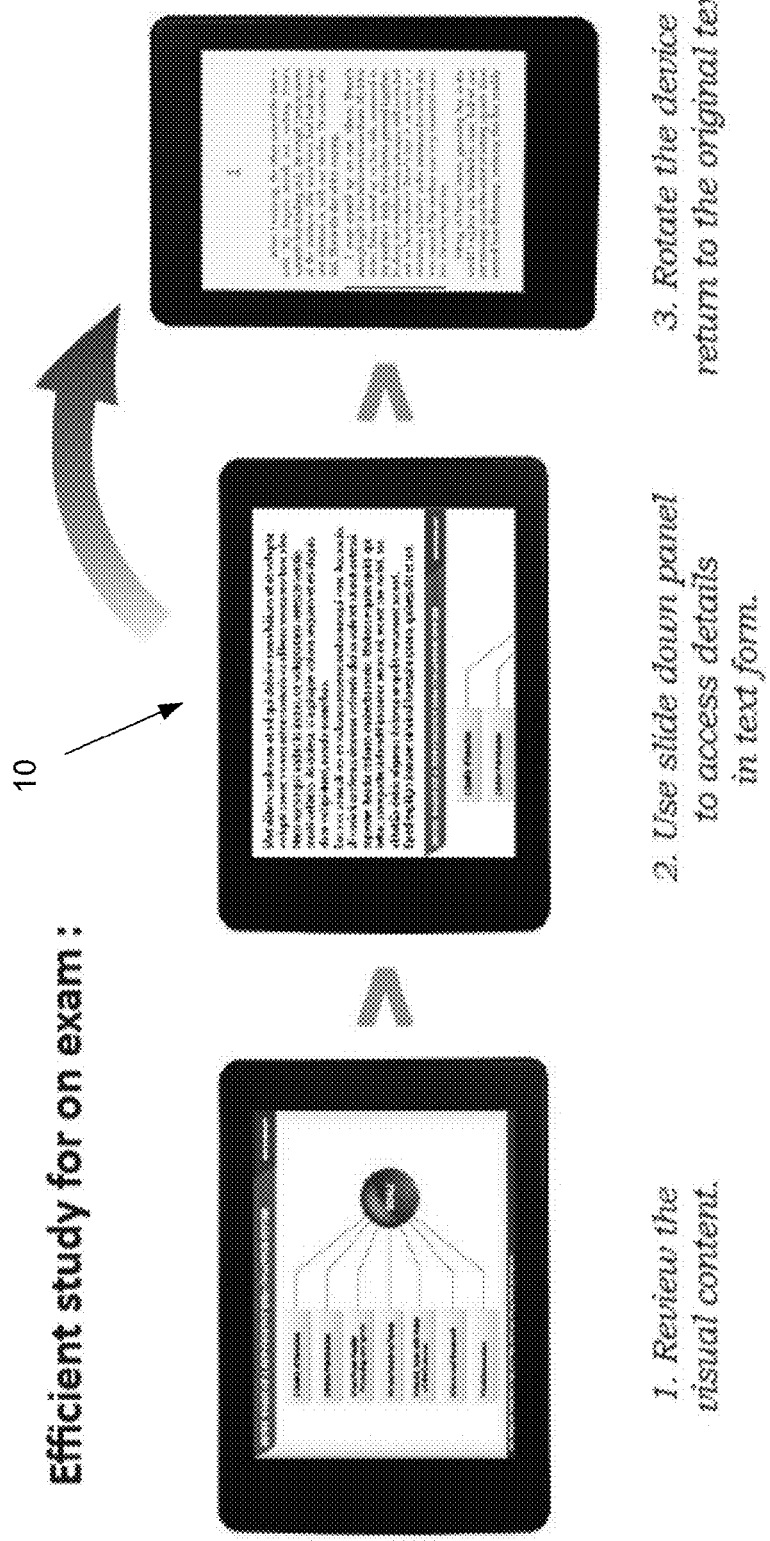

According to another embodiment and referring now to FIG. 13, there is shown a visual display 12 of the portable computing device 10. FIG. 13 shows that the computing portable device as described above may be an efficient method to study for an exam. In step 1, the user 32 (i.e., the student) can review the visual content 24 and in step 2, the user 32 can use slide down text content 20 to access details in the text data. In step 3, the user 32 (i.e., the student) can rotate the portable computing device 10 to return to the original text content 20.

Figure 14:
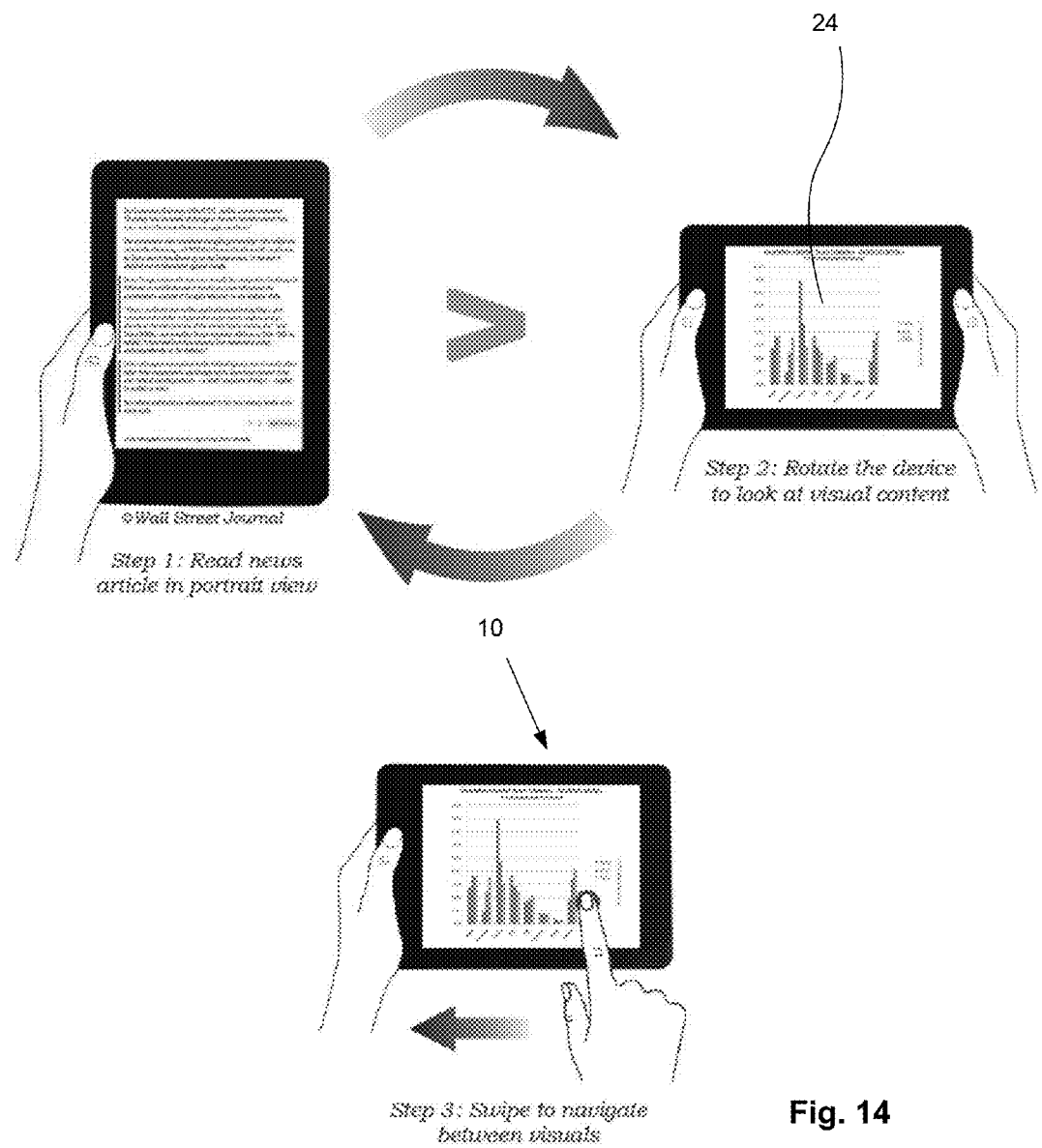

According to another embodiment and referring now to FIG. 14, there is shown a visual display 12 of the portable computing device 10. FIG. 14 illustrates the visual display 12 of a journal article on the portable computing device 10. In step 1, the user 32 reads a news article in the portrait mode 16 orientation. In step 2, the user 32 rotates the portable computing device 10 in the landscape mode 18 orientation to look at the visual content 24 and in step 3, the user 32 swipes to navigate between visual contents 24.

According to another embodiment and referring now to FIG. 15, there is shown a visual display 12 of the portable computing device 10. FIG. 15 illustrates business and trade eBooks. Indeed, managers and professionals often read to enhance their general knowledge. Multiple studies have shown that most of them are visual learners. All five ways previously described to make eReading a superior experience, in the previous are applicable to business and trade eBooks. Accordingly, if managers and/or professionals want to communicate or implement concepts and practices from a book, they can buy an editable corporate version of the eBook with its visual content indicators 22.

Figure 16:
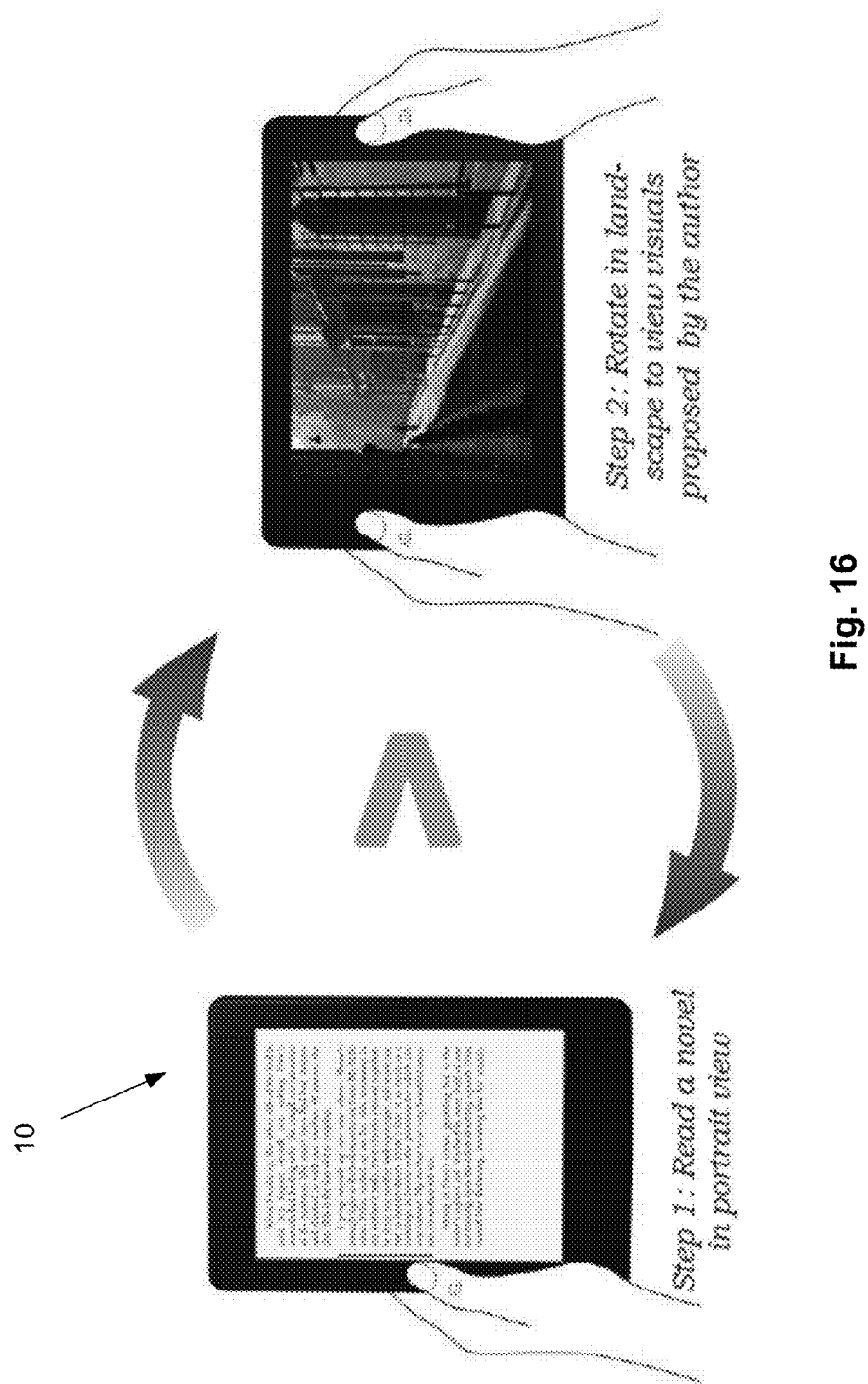

According to another embodiment and referring now to FIG. 16, there is shown a visual display 12 of the portable computing device 10. FIG. 16 illustrates that the method for controlling the output 14 presented on a visual display 12 of a portable computing device 10 is also useful for novels. Indeed, authors may have visual content 24 in mind (i.e., places, people, and the like) that they want the user 32 (i.e., the reader) to look at while reading the eBook. As shown, in step 1, the user 32 (i.e., the reader) reads the novel in a portrait mode 16 orientation and in step 2, the user rotates the portable computing device 10 in a landscape mode 18 orientation to view visual contents 24 proposed by the author.

Figure 17:
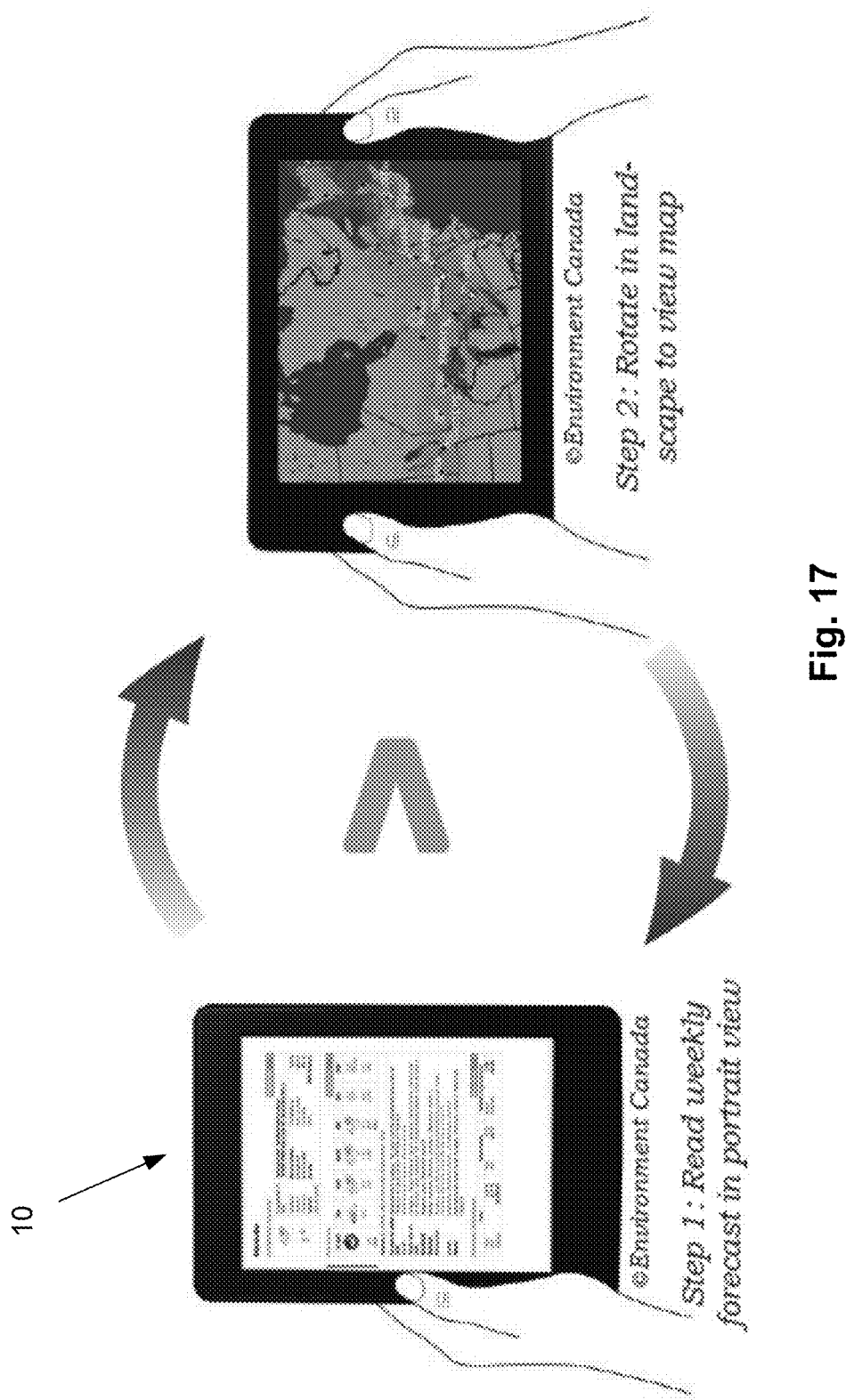

According to another embodiment and referring now to FIG. 17, there is shown a visual display 12 of the portable computing device 10. FIG. 17 illustrates that the method for controlling the output 14 presented on a visual display 12 of a portable computing device 10 is also useful for weather forecasts. As shown, in step 1, the user 32 reads the weekly forecast in the portrait mode 16 orientation and in step 2, the user 32 rotates the portable computing device 10 in the landscape mode 18 orientation to view the visual content 24 (i.e., the map).

Figure 18:
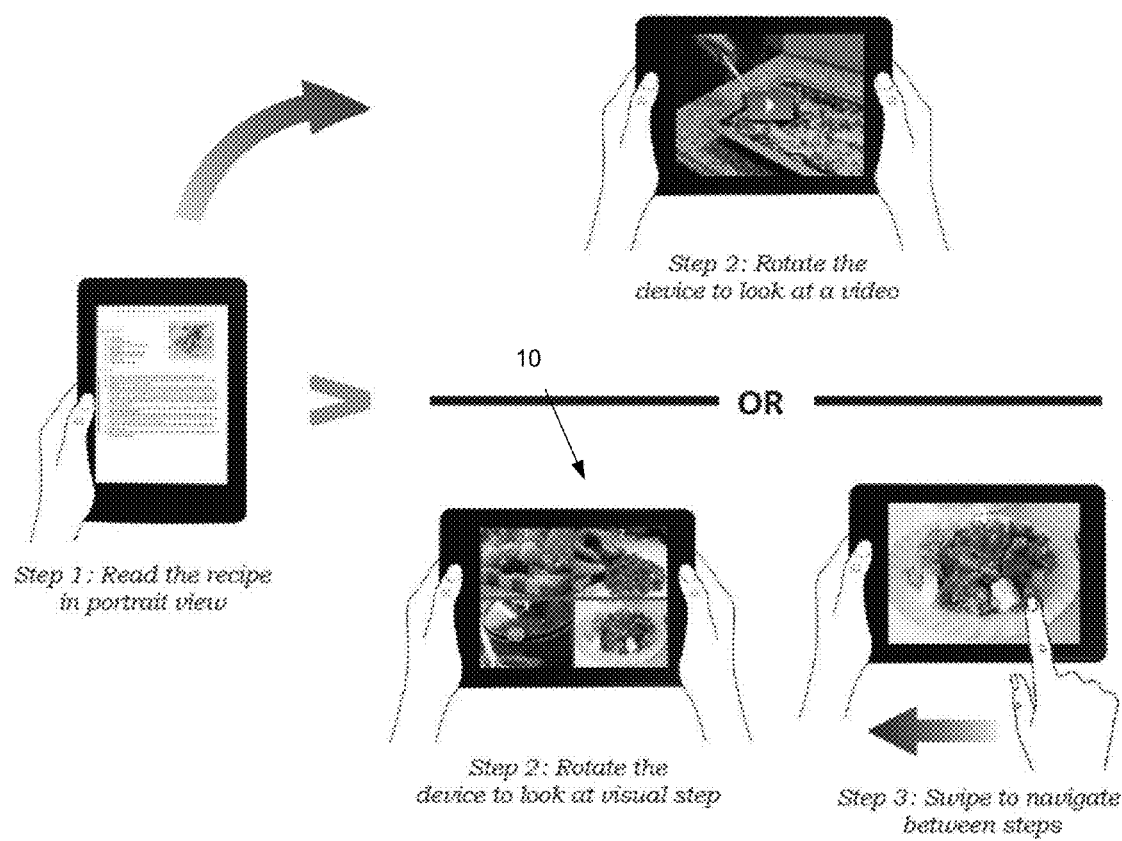

According to another embodiment and referring now to FIG. 18, there is shown a visual display 12 of the portable computing device 10. FIG. 18 illustrates that the method for controlling the output 14 presented on a visual display 12 of a portable computing device 10 is also useful for cook eBooks. As shown, in step 1, the user 32 reads the recipe in the portrait mode 16 orientation. In step 2, the user 32 decides to rotate the portable computing device 10 in the landscape mode 18 orientation to look at a video or decides to rotate the portable computing device 10 in the landscape mode 18 orientation to look at a visual step of the recipe and in step 3, swipes to navigate between different cooking steps.

Figure 19:
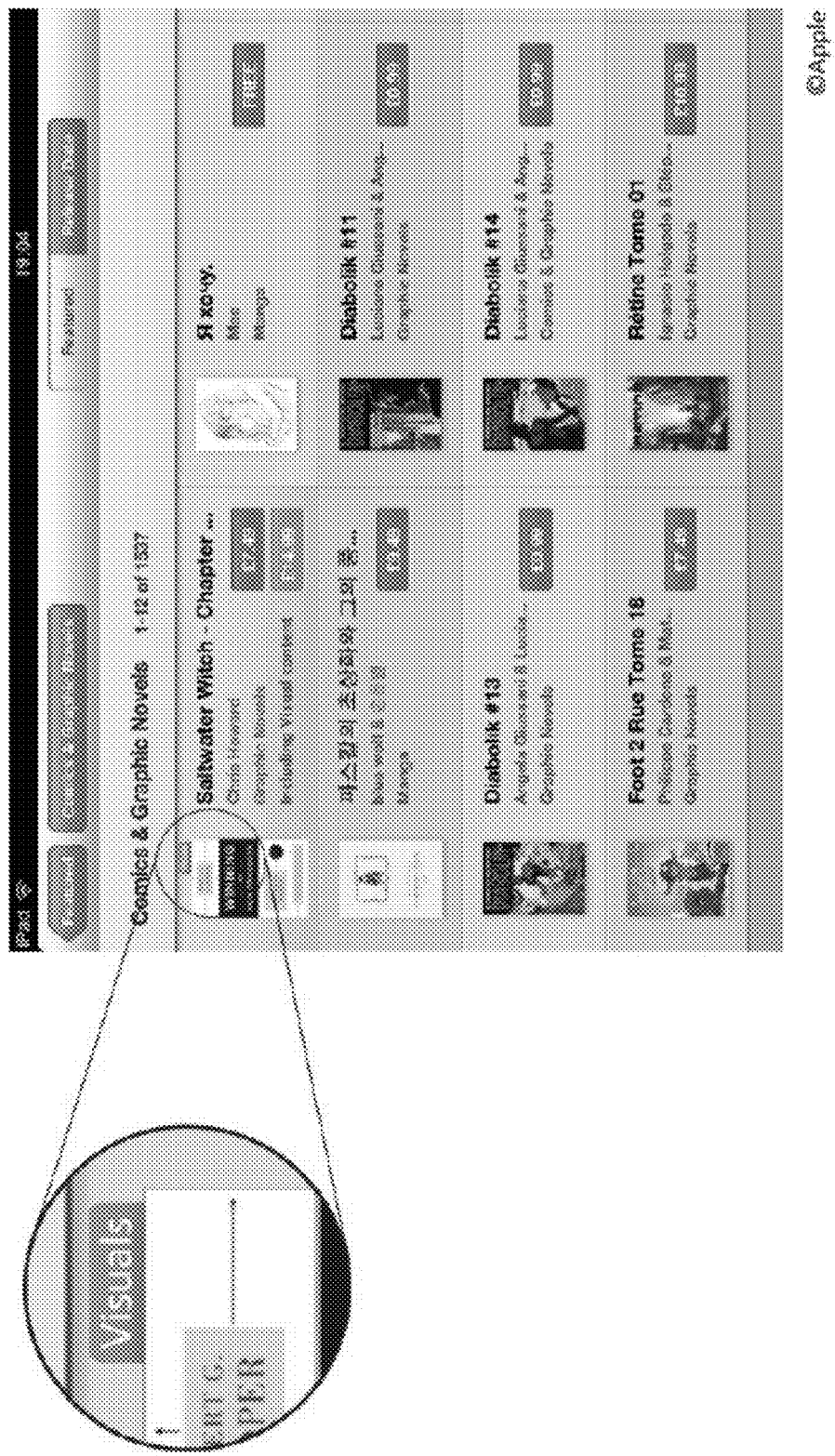

According to another embodiment and referring now to FIG. 19, there is shown a visual display 12 of the portable computing device 10. When visual content indicators 22 are available on an eBook store for example, it is indicated on the eBook itself. Also, the store may give an option to the user 32 to buy a standard eBook or an eBook available with the visual content indicators 22 and visual content 24. FIG. 19 gives an example with the Apple iBook store. For example, an eBook with embedded visual contents 24 may cost twice as much as the regular price of a standard eBook. It is also to be noted that visual contents 24 in eBooks are not editable. Also, visual indicators with visual contents 24 cannot be bought alone, they have to be purchased with an eBook. Thus, FIG. 19 presents a first possible revenue model for such a portable computing device 10.

Figure 20:
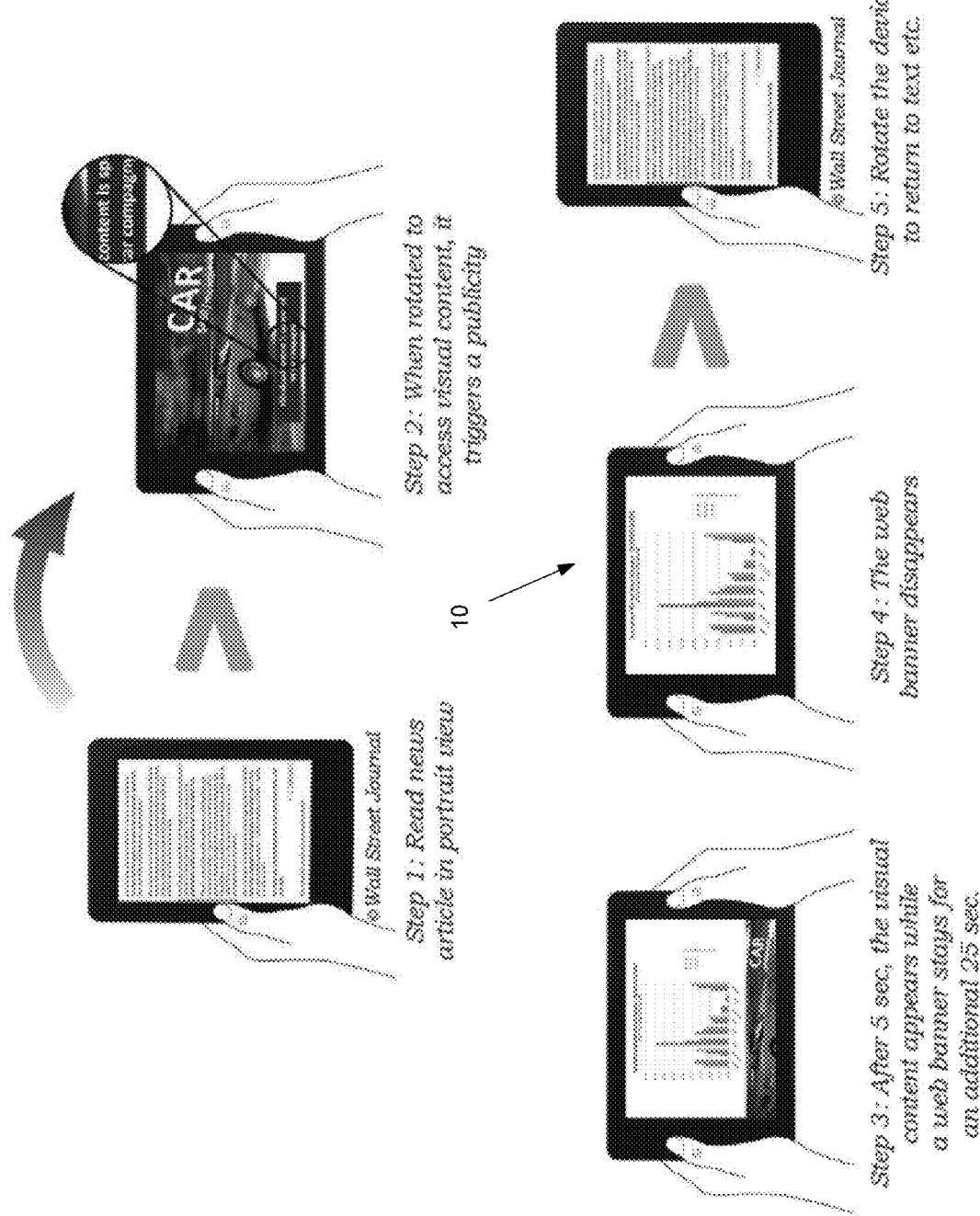

According to another embodiment and referring now to FIG. 20, there is shown a visual display 12 of the portable computing device 10. FIG. 20 illustrated a second possible revenue model. eBooks with visual content indicators 22 and visual content 24 may also be applicable for free Internet content such as news, specialty or general content websites. As shown, in step one, a user 32 reads a news article in the portrait mode 16 orientation and in step 2, when the portable computing device 10 is rotated in the landscape mode 18 orientation to access the visual contents 24, it triggers publicity or advertising. In step 3, after 5 seconds, for example, the visual content 24 appears while a web banner stays for an additional 25 seconds for example. In step 4, the web banner disappears. In step 5, the user 32 rotates the portable computing device 10 in the portrait mode 16 orientation to return to text content 20, etc. It is to be noted that in some cases, only one ad per article can appear, therefore, if a news article contains four visual contents 24 (i.e., pictures, graphics, etc.), it would show a publicity only when the first visual content 24 appears.

Figure 21:
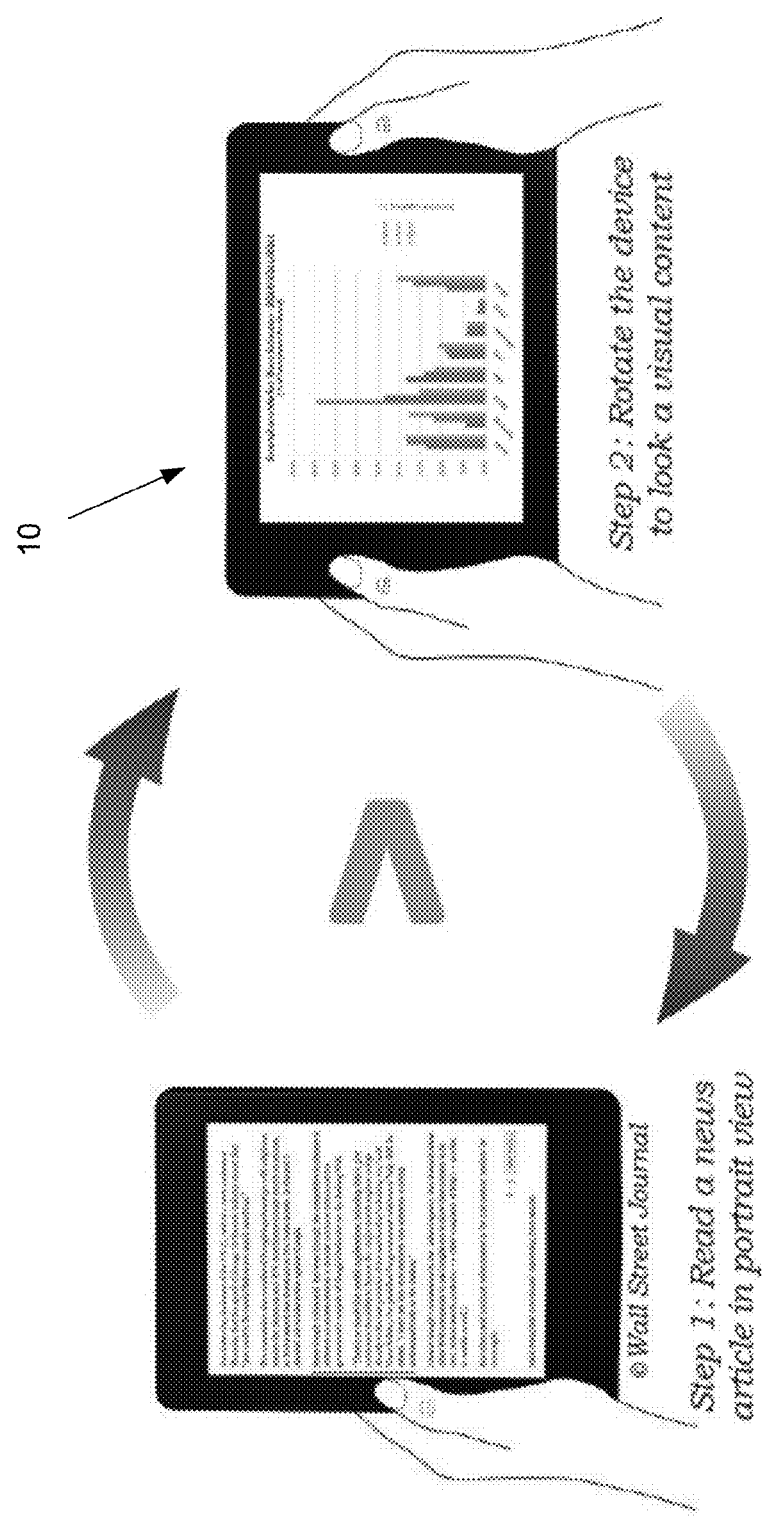

According to another embodiment and referring now to FIG. 21, there is shown a visual display 12 of the portable computing device 10. FIG. 21 illustrates a third possible revenue model, free content with membership fee. Accordingly, a paying member of a website (i.e., a journal for example) would not receive ads. As shown, in step 1, the user 32 reads a news article in the portrait mode 16 orientation. In step 2, the user 32 rotates the portable computing device 10 in the landscape mode 18 configuration to look at a visual content 24.

Figure 22:
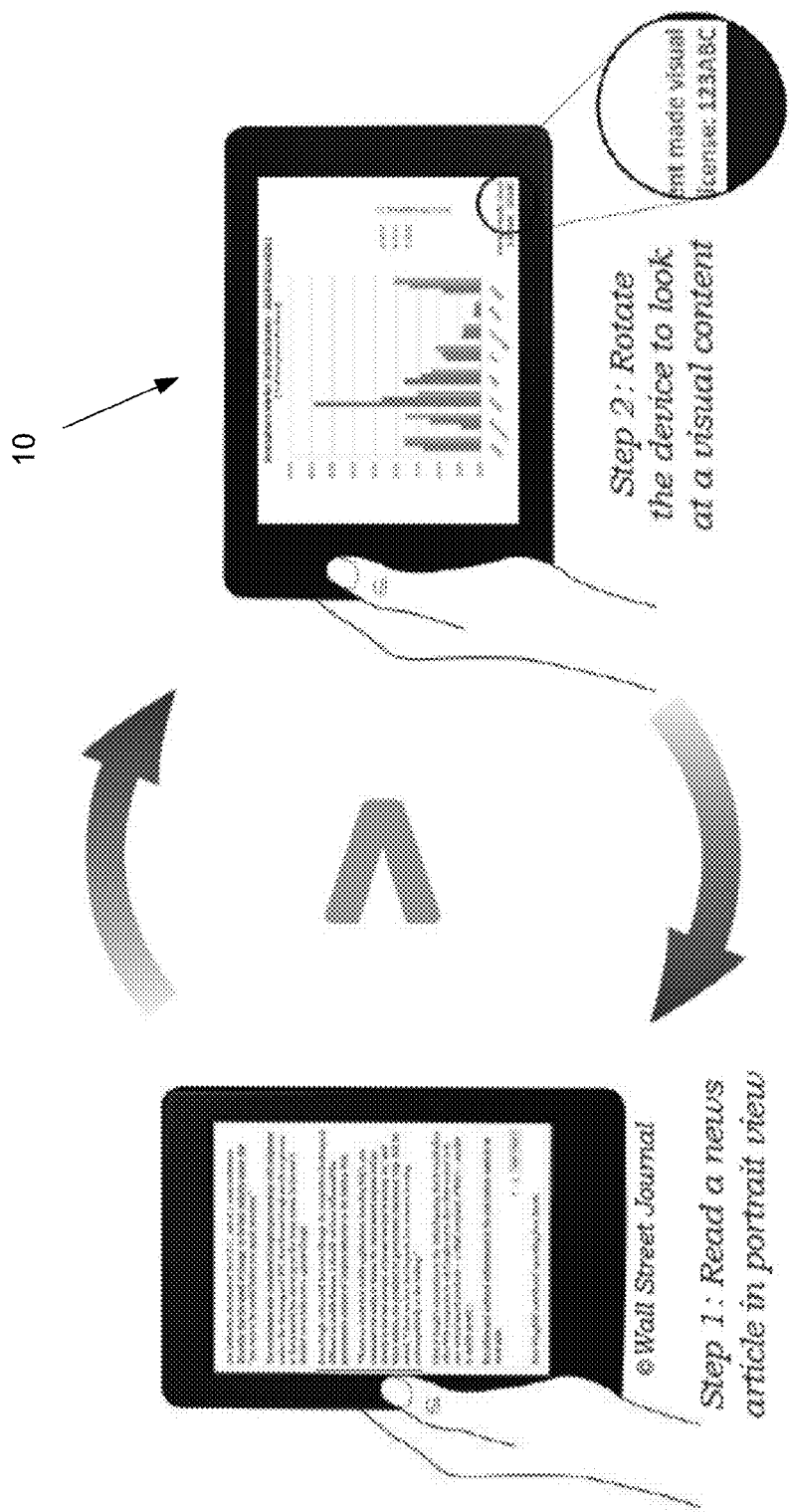

According to another embodiment and referring now to FIG. 22, there is shown a visual display 12 of the portable computing device 10. FIG. 22 illustrates a fourth possible revenue model, free content with license. Accordingly, website owners may register their visual contents 24 through a one-time fee, therefore, the user 32 will not receive publicity. A license number may be issued for each visual content 24 registered. As shown, in step 1, the user 32 reads a news article in the portrait mode 16 orientation and in step 2, the user 32 rotates the portable computing device 10 in the landscape mode 18 orientation, where a license number appears.

Figure 23:
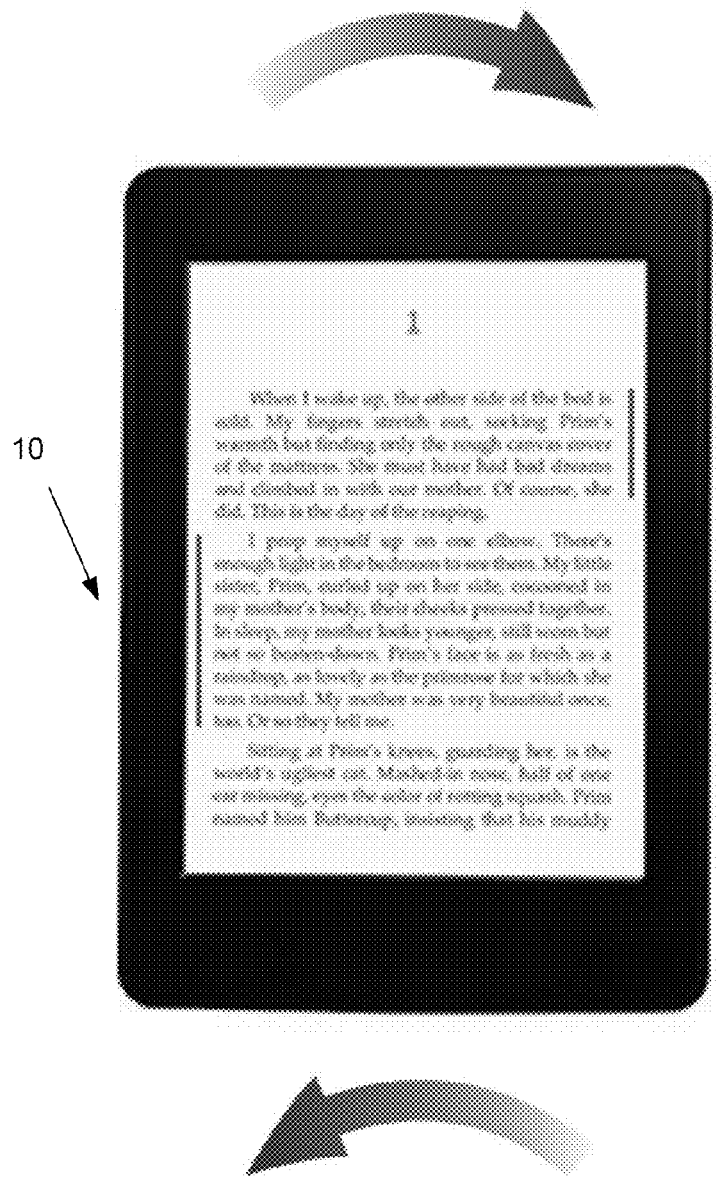

According to another embodiment and referring now to FIG. 23, there is shown a visual display 12 of the portable computing device 10. FIG. 23 illustrated that it is possible to rotate the portable computing device 10 in both directions. It is possible to turn the portable computing device 10 in the clockwise direction to access the visual content 24 of the left side visual content indicator 22. It is also possible to turn the portable computing device 10 in the counterclockwise direction to access the visual content 24 of the right side visual content indicator 22.

Figure 24:
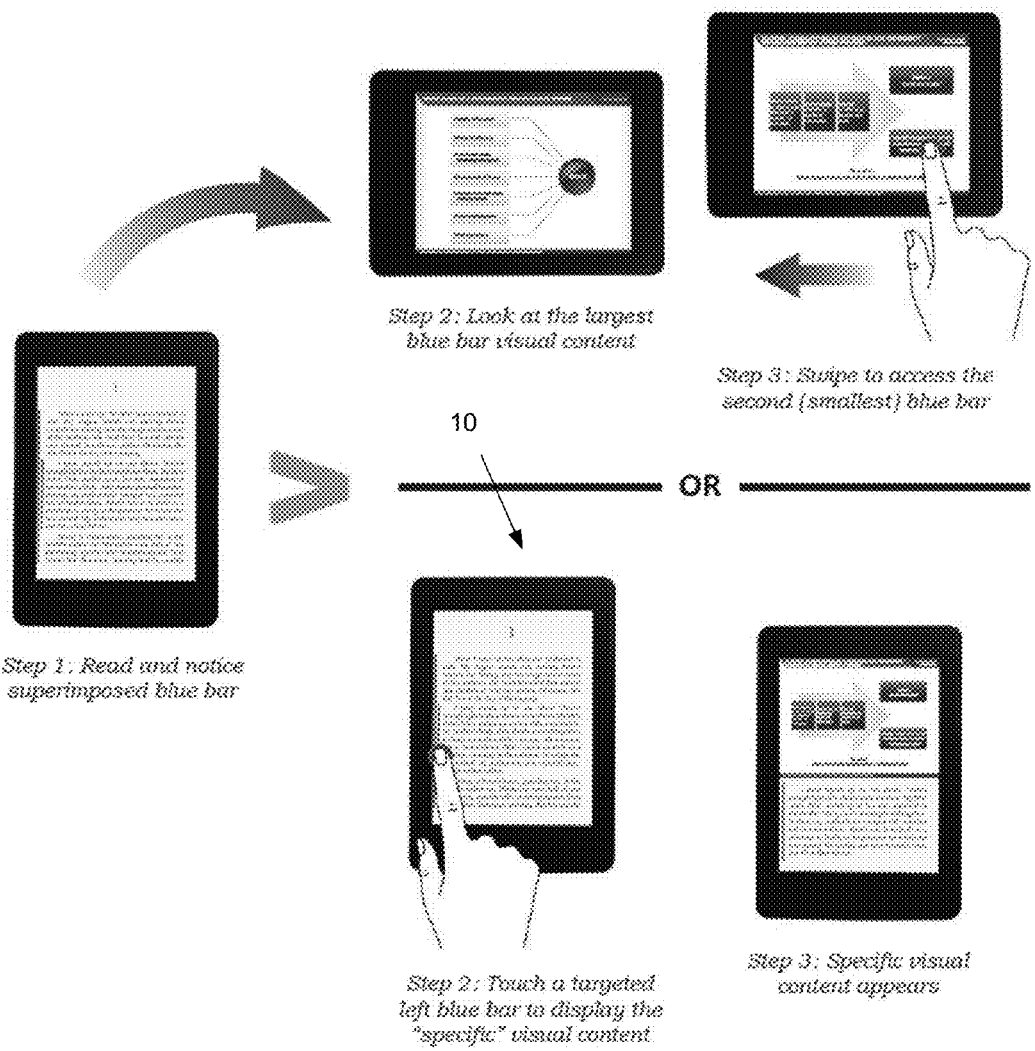

According to another embodiment and referring now to FIG. 24, there is shown a visual display 12 of the portable computing device 10. FIG. 24 shows that it is also possible to superimpose visual indicators. As shown, in step 1, a user 32 reads and notice superimposed visual content indicators 22. In step 2, the user 32 looks at the largest visual content indicator 22 (i.e., a blue bar for example) and in step 3, the user 32 swipes to access the second (i.e., the smallest) visual content indicator 22 (i.e., the blue bar). Alternatively, in step 2, the user 32 may touch a targeted visual content indicator 22 (i.e., a targeted left blue bar) to display the associated visual content 24 and in step 3, the associated visual content 24 appears.

Figure 25:
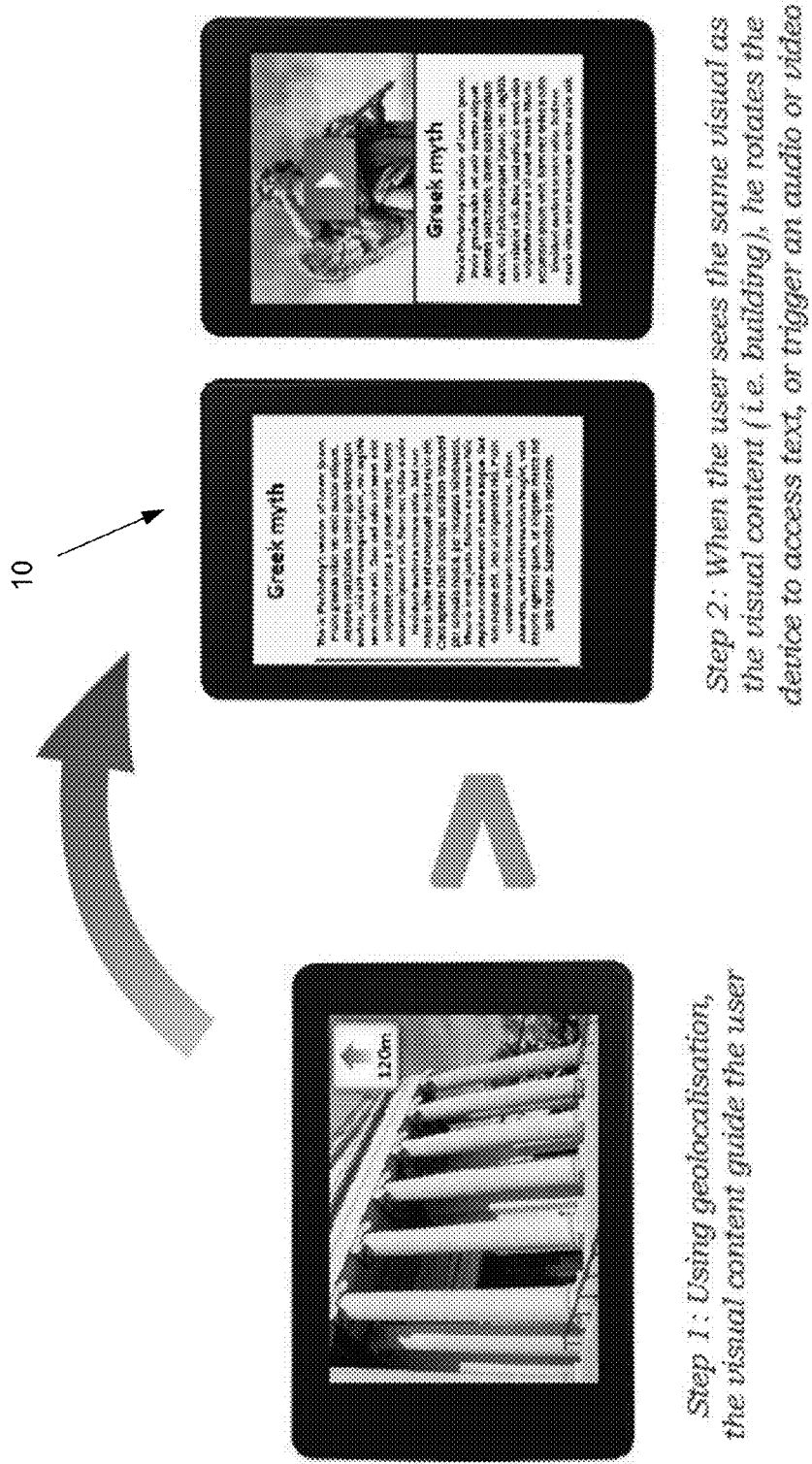

According to another embodiment and referring now to FIG. 25, there is shown a visual display 12 of the portable computing device 10. FIG. 25 shows that it is possible to have visual content 24 adapted to text content 20 with the use of geolocalisation. As shown, in step 1, when using geolocalisation on a portable computing device 10, the visual content 24 in a portrait mode 16 orientation guides the user 32. In step 2, when the user 32 sees the same external visual as the visual content 24 (i.e., a building for example), he rotates the portable computing device 10 to access text content 20 in the portrait mode 16 orientation, or trigger an audio or video.

Figure 26:
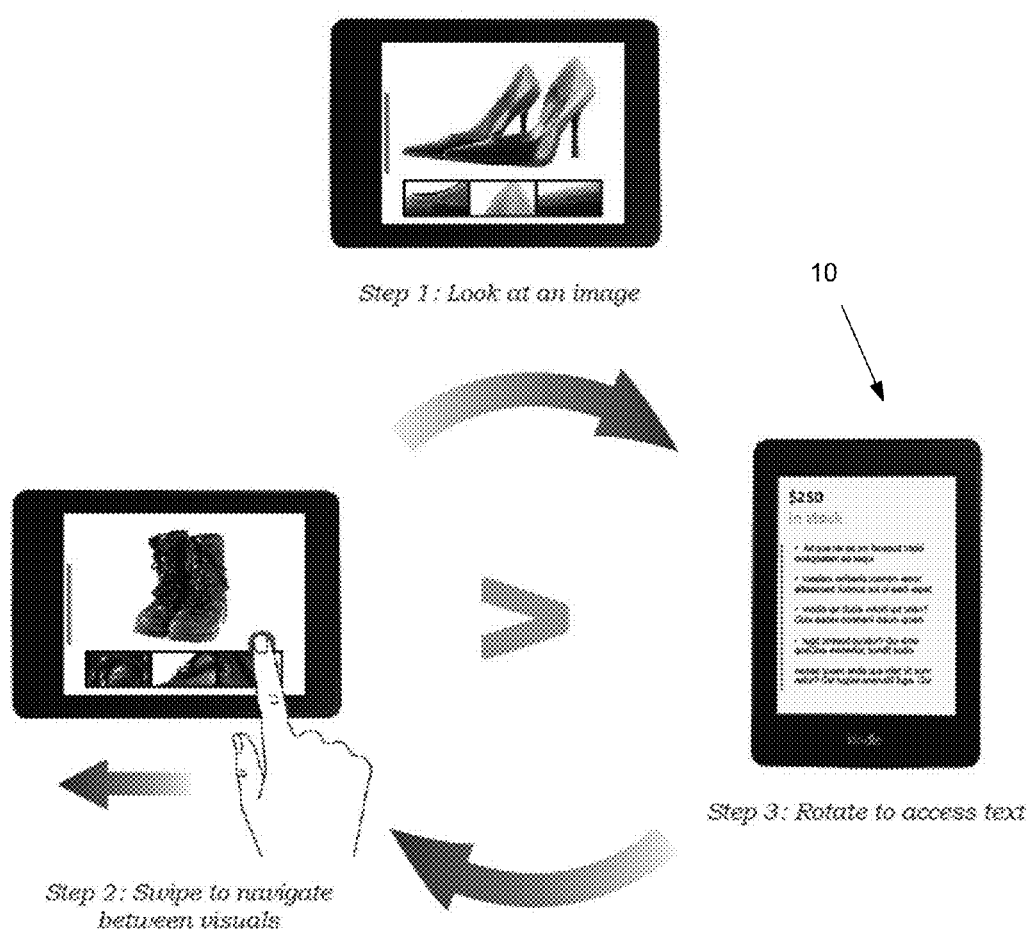

According to another embodiment and referring now to FIG. 26, there is shown a visual display 12 of the portable computing device 10. FIG. 26 illustrates that it is further possible to perform on-line shopping. As shown, a visual content indicator 22 (i.e., the blue line) may indicate, in the landscape mode 18 orientation, that there exists text content 20 associated with the visual content 24. In step 1, the user 32 (i.e., the eShopper) looks at a visual content 24 and in step 2, the user 32 swipes to navigate between visual contents 24. In step 3, the user 32 rotates the portable computing device 10 in the landscape mode 18 orientation to access text content 20.

Figure 27:
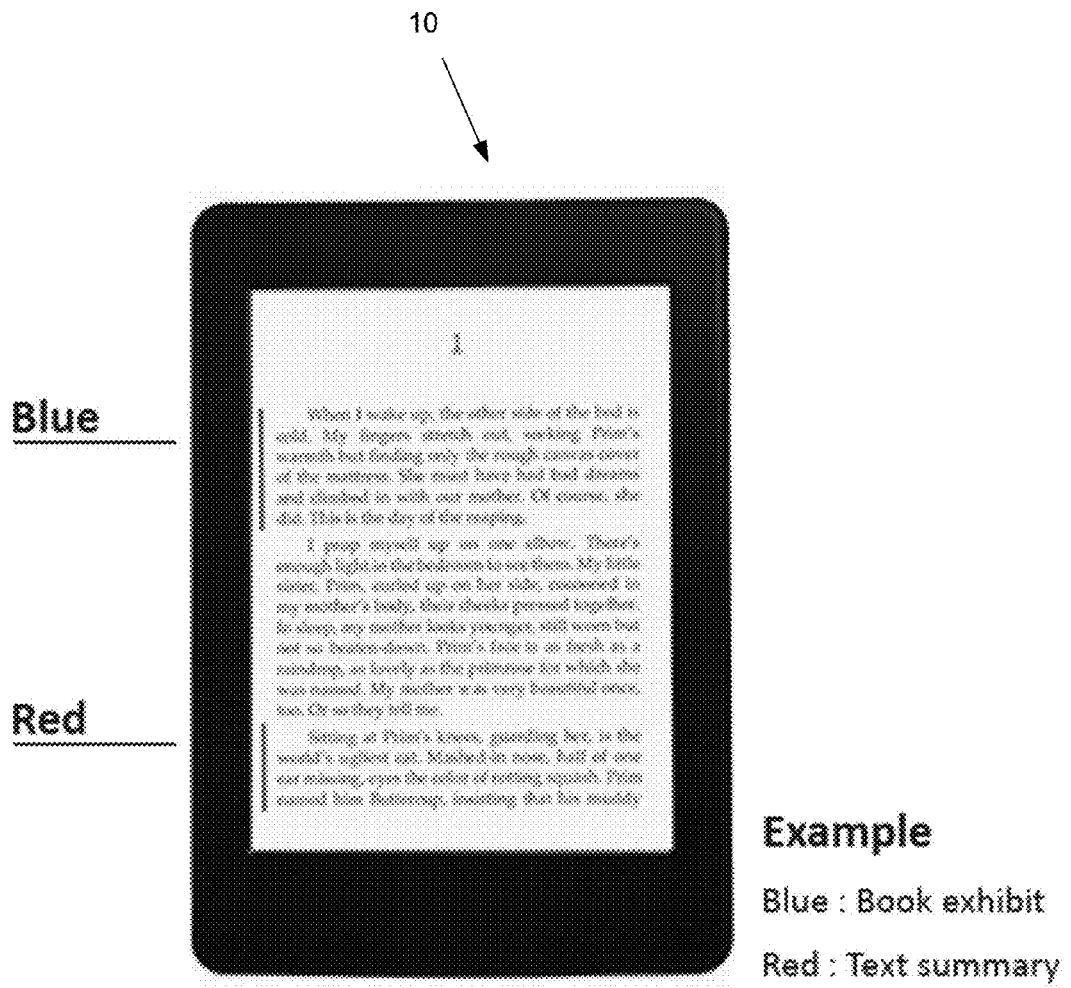

According to another embodiment and referring now to FIG. 27, there is shown a visual display 12 of the portable computing device 10. FIG. 27 illustrates that a multiple-color coded visual content indicator 22 may appear. Visual content indicators 22 can be color coded or use texture to indicate different kind of visual content 24. As shown, a first visual content indicator 22 (i.e., the upper blue indicator) may allow the user 32 to see a book exhibit, while a second visual content indicator 22 (i.e., the lower red indicator) may allow the user 32 to see a text summary.

Figure 28:
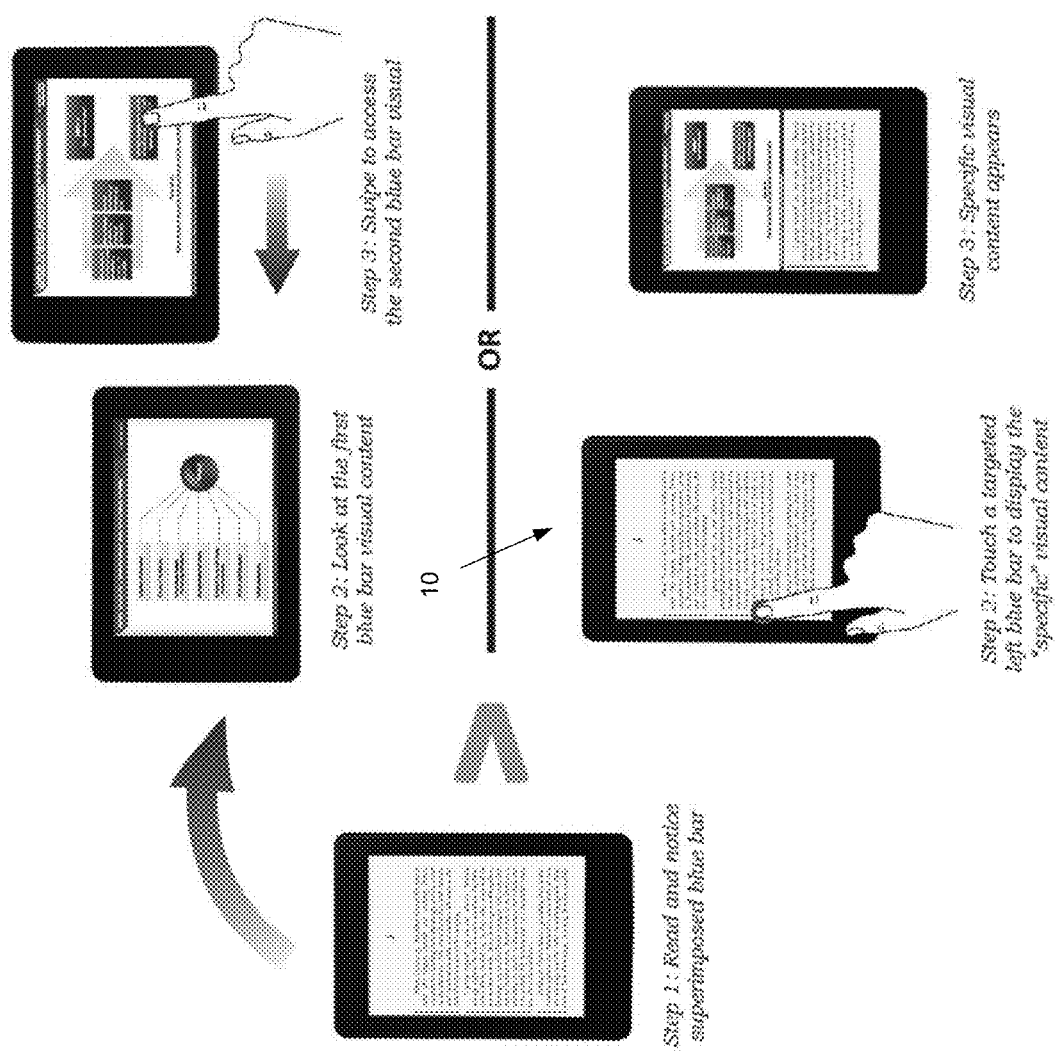

According to another embodiment and referring now to FIG. 28, there is shown a visual display 12 of the portable computing device 10. FIG. 28 illustrates that multiple visual indicators may be located in the same page. As shown, in step 1, the user 32 reads and notices superimposed visual content indicators 22 (i.e., superimposed blue bars). In step 2, the user 32 looks at the visual content 24 of the first visual content indicator 22 and in step 3, swipes to access the visual content 24 of the second visual content indicator 22. Alternatively, in step 2, the user 32 may touch a targeted visual content indicator 22 (i.e., a targeted left blue bar) to display the corresponding visual content 24 and in step 3, the corresponding visual content 24 appears.

Figure 29:
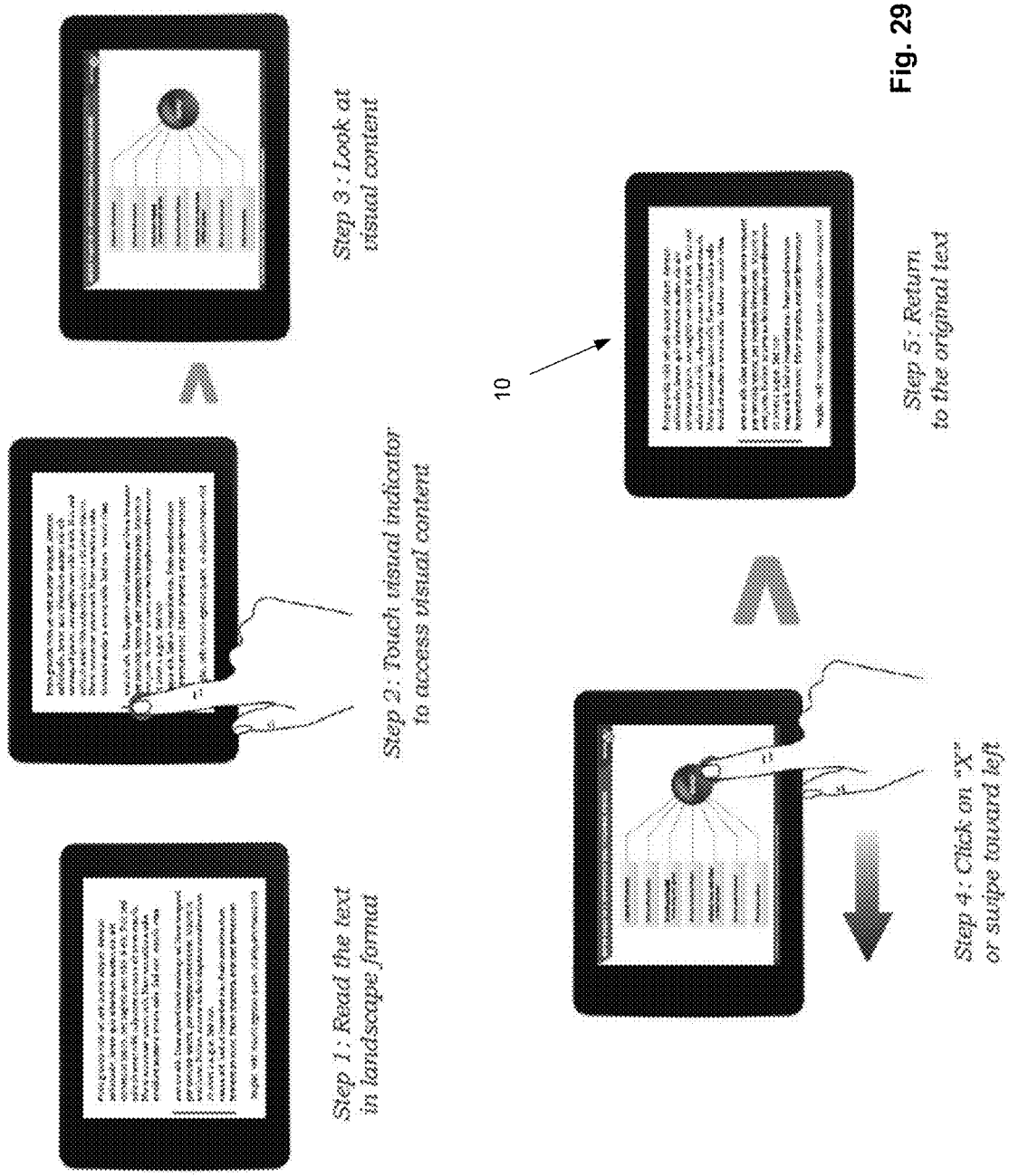

According to another embodiment and referring now to FIG. 29, there is shown a visual display 12 of the portable computing device 10. FIG. 29 illustrates that the portable computing device 10 also allows for a horizontal text format or a landscape mode 18 orientation only. As shown, in step 1, the user 32 reads the text content 20 in the landscape mode 18 orientation. In step 2, the user 32 touches the visual content indicator 22 to access visual content 24. In step 3, the user 32 looks at the visual content 24 and in step 4, the user 32 clicks on a "X" symbol, or on any suitable icon, or swipes toward left side. In step 5, the user 32 has returned to the original text content 20.

Figure 30:
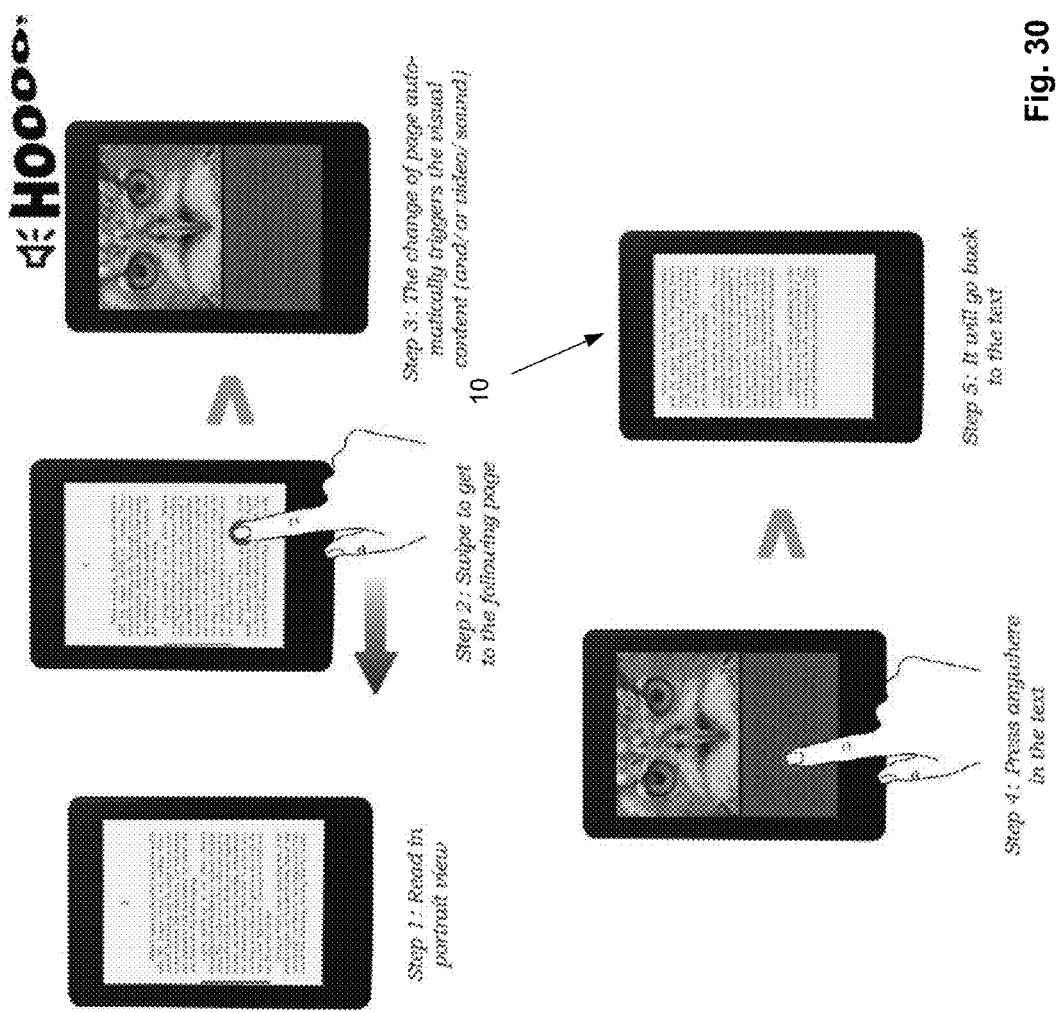

According to another embodiment and referring now to FIG. 30, there is shown a visual display 12 of the portable computing device 10. FIG. 30 illustrates that a finger swipe to a next page could trigger a visual content 24, especially to surprise the reader (i.e., the user 32) of the portable computing device 10. As shown, in step 1, the user 32 reads in the portrait mode 16 orientation. In step 2, the user 32 swipes to get to the following page and in step 3, the change of page automatically triggers the visual content 24 or a video, a sound and the like. In step 4, the user 32 presses anywhere in the text content 20 and in step 5, the user 32 is back to the text content 20.

According to another embodiment and referring now to FIG. 31, there is shown a visual display 12 of the portable computing device 10. FIG. 31 illustrates that it is possible to zoom in and out the visual content 24. As shown, in step 1, the user 32 looks at the visual content 24 on the landscape mode 18 orientation. In step 2, the user 32 uses his fingers to zoom in or zoom out the visual content 24.

Figure 32:
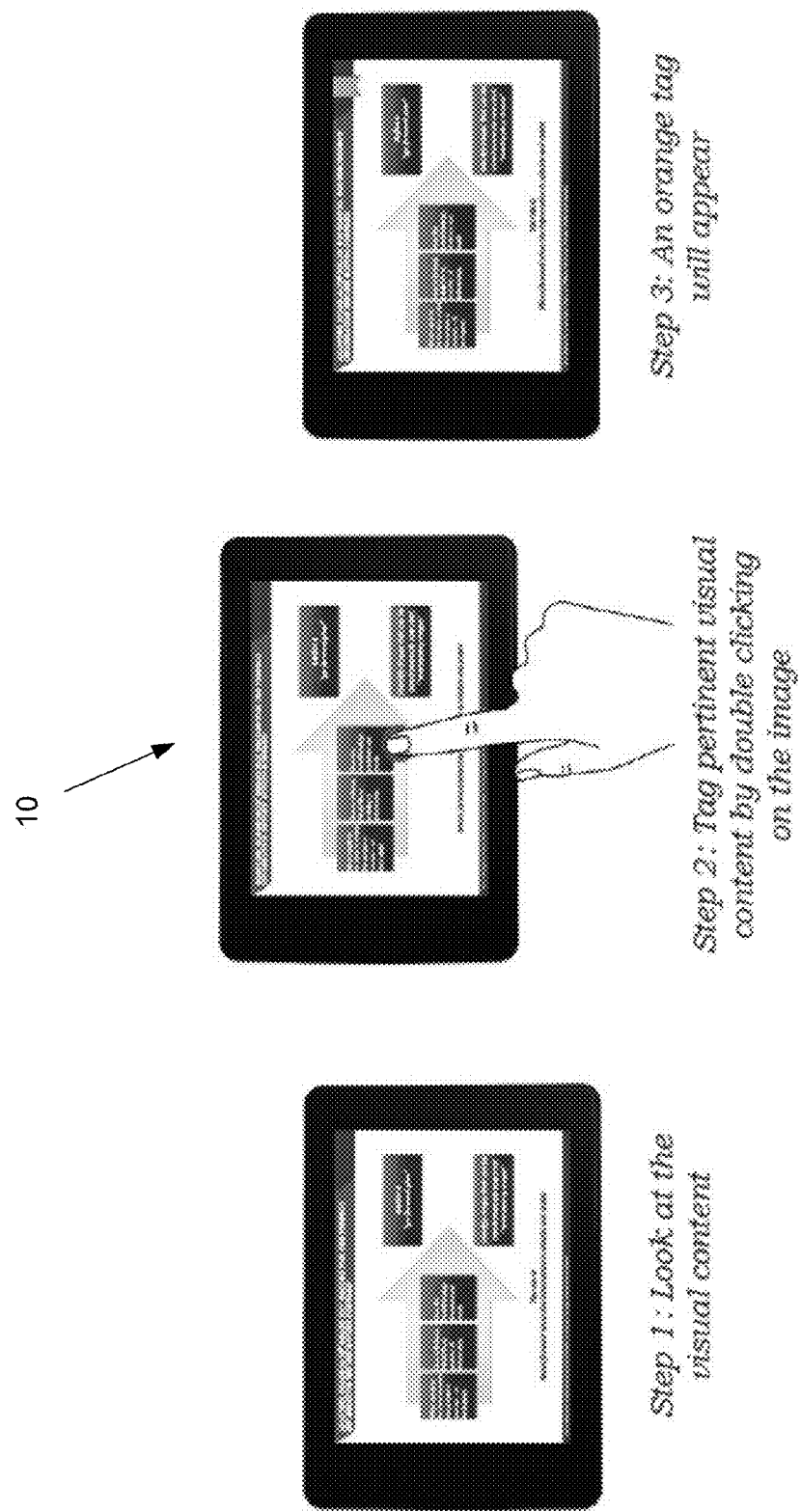

According to another embodiment and referring now to FIG. 32, there is shown a visual display 12 of the portable computing device 10. FIG. 32 shows that pertinent visual contents 24 can be tagged and reviewed in a summary. Steps 1 to 3 illustrate the tagging process. In step 1, the user 32 looks at the visual content 24 and in step 2, the user 32 tags pertinent visual content 24 by double clicking on the visual content 24. In step 3, a tag (i.e., a colored tag for example) will appear.

Figure 33:
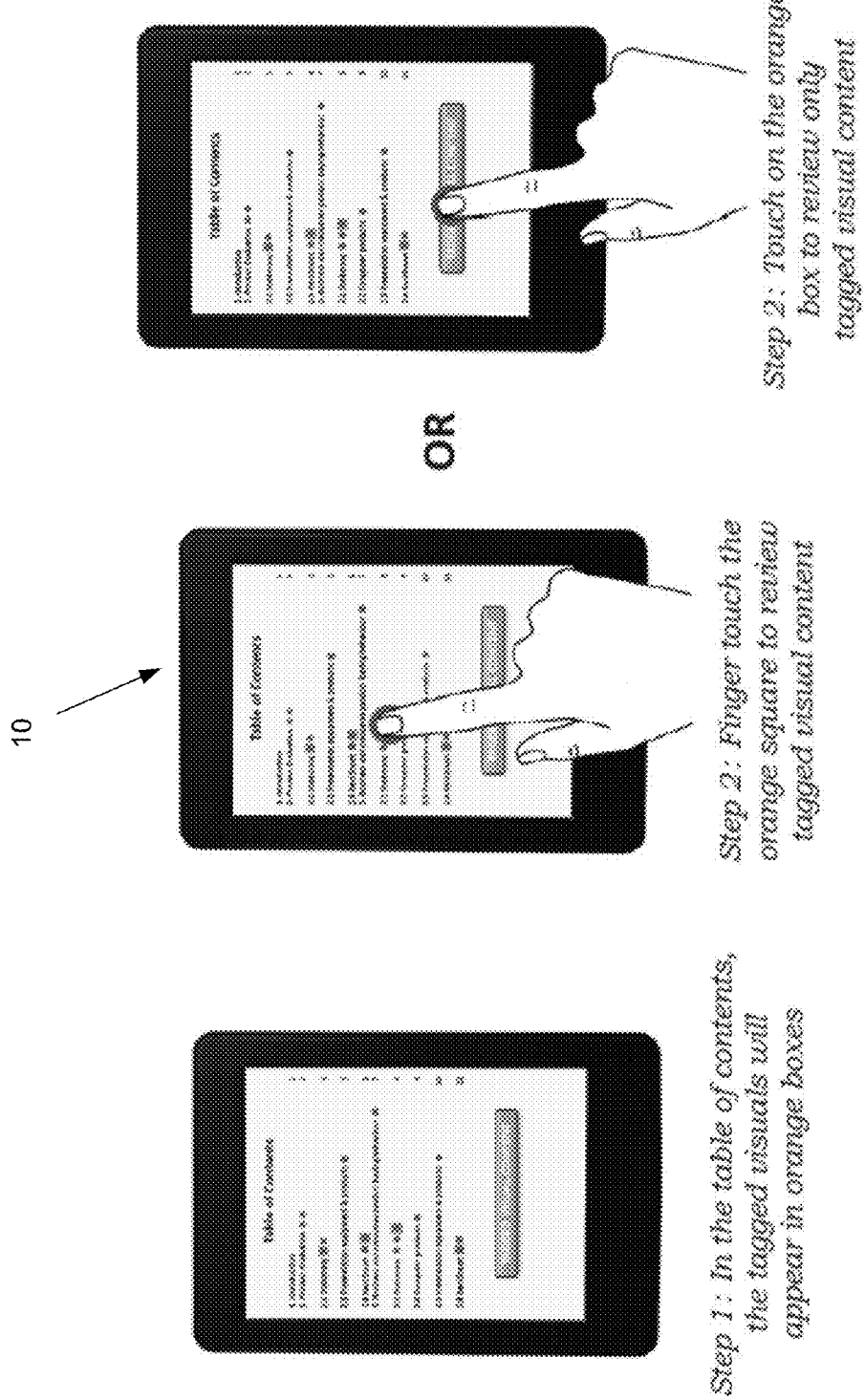

According to another embodiment and referring now to FIG. 33, there is shown a visual display 12 of the portable computing device 10. Steps 1 to 2 of FIG. 33 illustrate the reviewing process following the tagging process of FIG. 32. In step 1, in the table of contents, the tagged visual contents 24 will appear (i.e., in color boxes for example). In step 2, the user 32 finger touches the tagged visual contents 24 to review tagged visual contents 24. Alternatively, in step 2, the user 32 touches on the box (i.e., the bottom box) with the finger to review only tagged contents.

Figure 34:
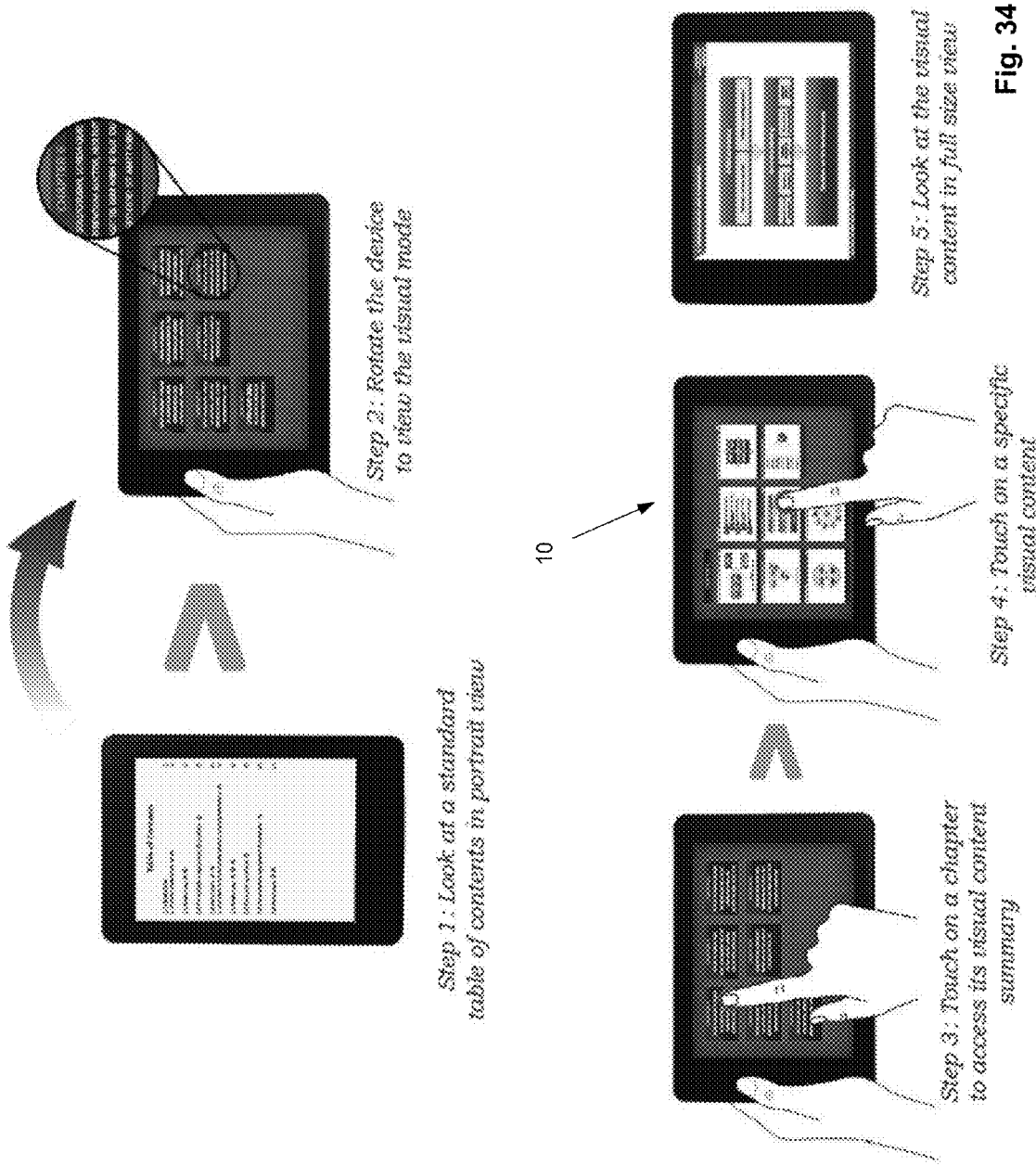

According to another embodiment and referring now to FIG. 34, there is shown a visual display 12 of the portable computing device 10. FIG. 34 illustrates that the table of content can be looked in visual content 24 using the landscape mode 18 orientation. As shown, in step 1, the user 32 looks at a standard table of contents in the portrait mode 16 orientation. In step 2, the user 32 rotates the portable computing device 10 to view the table of contents as a visual content 24. In step 3, the user 32 touches on a chapter title or number to access its summary as a visual content 24 and in step 4, the user 32 touches a specific visual content 24. In step 5, the user 32 looks at the visual content 24 in a full size view.

Figure 35:
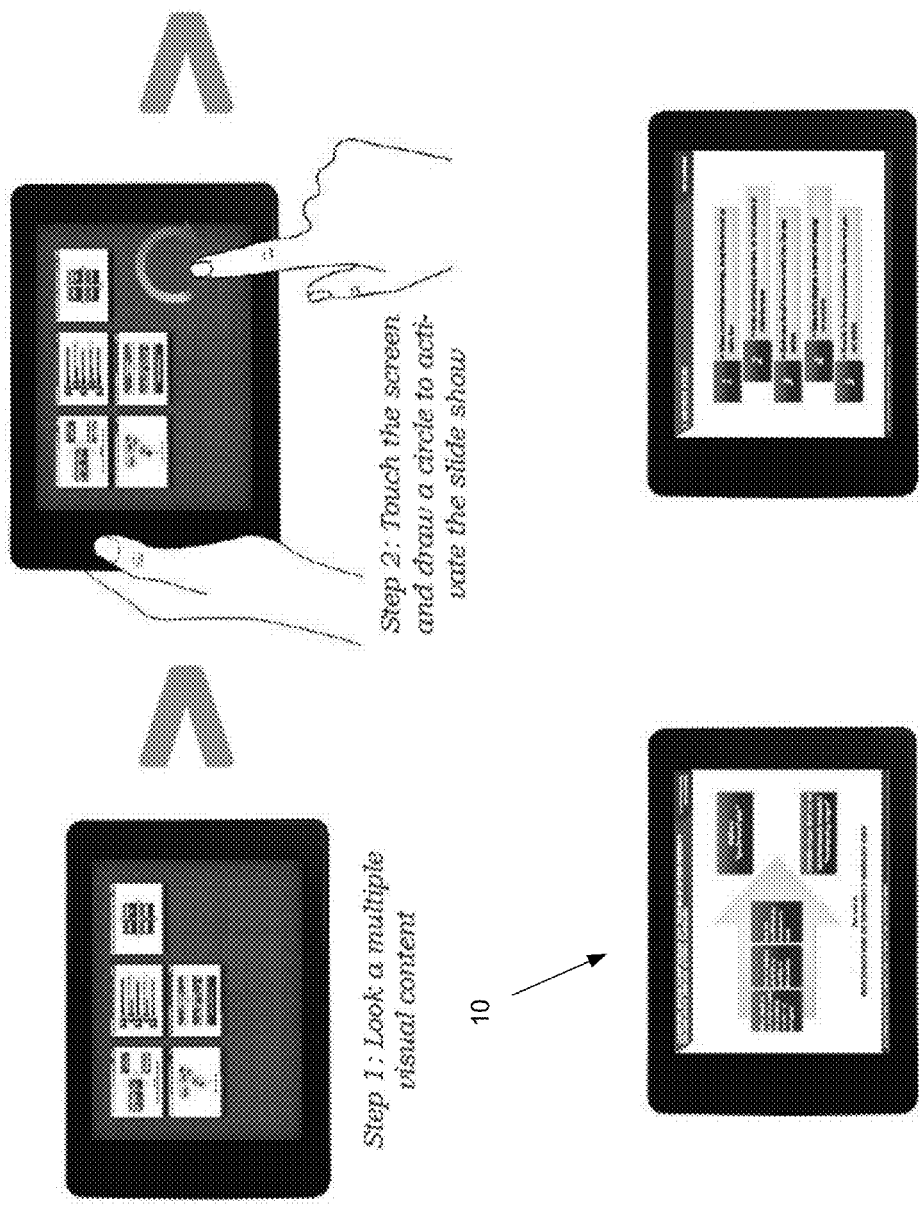

According to another embodiment and referring now to FIG. 35, there is shown a visual display 12 of the portable computing device 10. FIG. 35 illustrates that it is possible, when multiple visual contents 24 are presented, to display a slide show. As shown, in step 1, the user 32 looks at multiple visual contents 24. In step 2, the user 32 touches the screen of his portable computing device 10 and draws a circle to activate the slide show. In step 3, the user 32 looks at the visual content 24 in a full size view. In step 4, the user 32 looks at the second visual content 24 which will appear on the screen after a certain period of time (i.e., 5 seconds for example), and so on.

Figure 36:
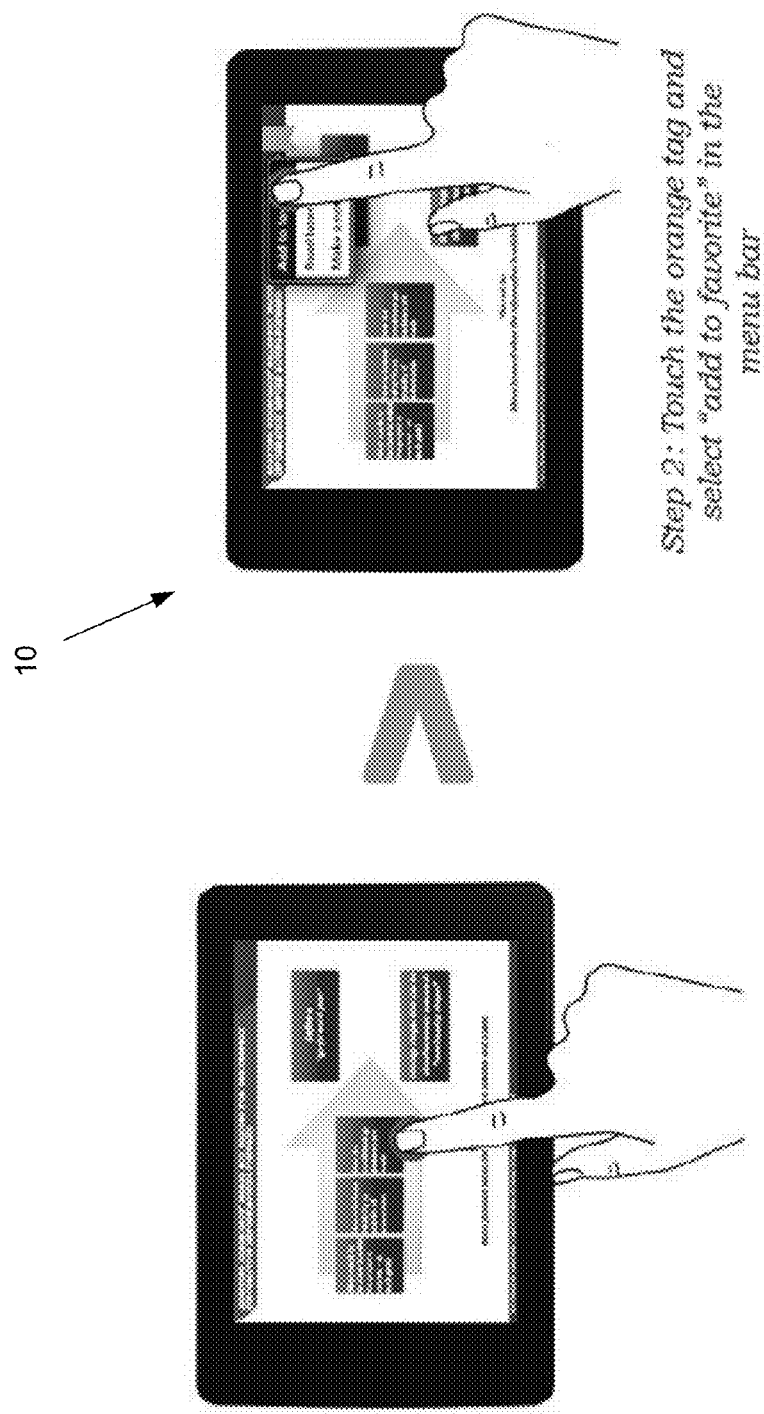

According to another embodiment and referring now to FIG. 36, there is shown a visual display 12 of the portable computing device 10. FIG. 36 shows that the user 32 can pick favorite visual contents 24 from various books which are kept in a consolidated bucket. As shown, in step 1, the user 32 tags a visual content 24 by double touching on the visual content 24. In step 2, the user 32 touches the tag (i.e., a color tag) and selects "add to favorite" in the menu bar.

Figure 37:
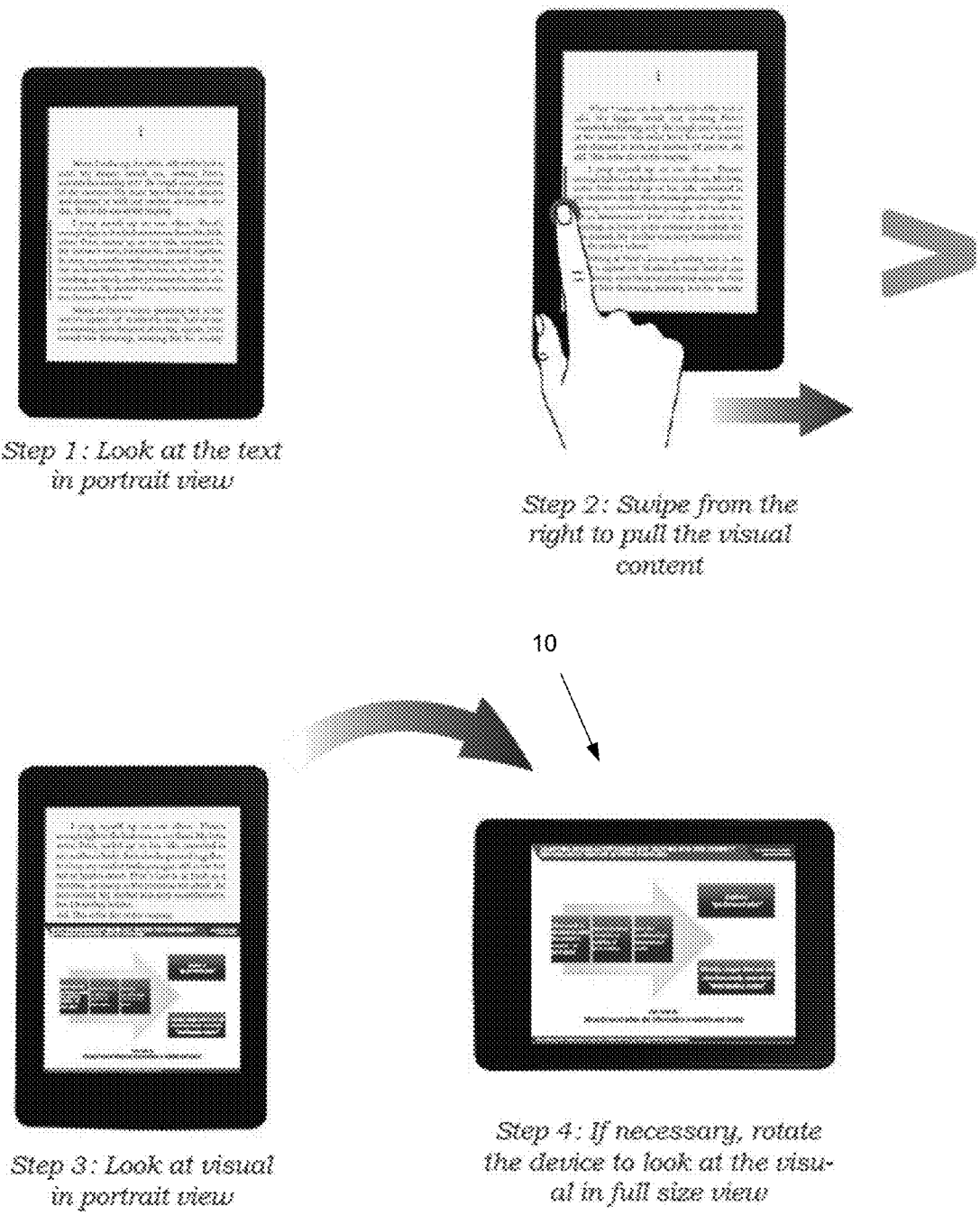

According to another embodiment and referring now to FIG. 37, there is shown a visual display 12 of the portable computing device 10. FIG. 37 shows that it is possible, when there is a visual content indicator 22 in the text content 20, to display the visual content 24 in the portrait mode 16 orientation by swiping finger toward the right side of the screen of the portable computing device 10. As shown, in FIG. 1, the user 32 looks at the text in the portrait mode 16 orientation and in step 2, the user 32 swipes toward the right side to pull the visual content 24. In step 3, the user 32 looks at the visual content 24 in the portrait mode 16 orientation. In step 4, if necessary, the user 32 rotates the portable computing device 10 to look at the visual content 24 in a full size view. The right direction in this embodiment could be replaced by another direction such as left, up, down or diagonals, for example.

According to another embodiment, each time a rotation of the portable computing device 10 occurs, a count of rotations is incremented. This count of each time a visual content is displayed can be stored on the memory 30. If there is a connection to a communication network, the count can be sent to an external memory, such as on a remote server or computer. Storing the count can be temporary or permanent. The storing can be useful for the implementation of a payment based on the number of rotations/on the number of counts.

It should also be considered that for many features described herein and their accompanying figures, the portrait and landscape modes (16, 18) are interchangeable. Therefore, the terms "portrait" and "landscape" modes are used to reflect that in most applications found on portable computing devices 10, text is displayed in a portrait mode 16 and pictures are presented in a landscape mode 18. Nonetheless, interchanging both modes or using modes that would be off the vertical and horizontal axes are considered as possible variants comprised in the scope of the disclosure.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A method for controlling an output presented on a visual display of a portable computing device having an orientation, the portable computing device comprising a memory on which is stored visual contents, each one of the visual contents comprising at least one of graphics data, photo data and video data, and text content substantially comprising text data, the text content further comprising visual content indicators visually associated with a respective parts of the text data, each of the visual content indicators being indicative of the existence of a respective one of the visual contents, the respective one of the visual contents being linked to a respective part of the text data visually associated by at least one of the visual content indicators, wherein the visual content indicators take substantially the same visual form throughout the text content, the method comprising:

detecting the orientation of the portable computing device as corresponding to one of a first display mode and a second display mode;

in the orientation corresponding to the first display mode, presenting the text content without presenting the visual contents and without presenting one or more pictures, photos, and videos, the text content comprising the text data and at least one of the visual content indicators visually associated with at least one of the respective parts of the text data on the visual display; said respective parts of the text data each being less than the text data being displayed on said visual display;

in the presence of one of the at least one of the visual content indicators, detecting a change of the orientation corresponding to the first display mode to the orientation corresponding to the second display mode;

the change in orientation triggering a loading, from the memory, of the respective one of the visual contents for display in the second display mode; and in the orientation corresponding to the second display mode, presenting the respective one of the visual contents on the visual display without presenting the text content presented in the first display mode.

2. The method of claim 1, wherein the detecting the orientation as corresponding to one of a first display mode and a second display mode comprises detecting the orientation as corresponding to one of a portrait mode and a landscape mode, respectively.

3. The method of claim 1, further comprising, in the orientation corresponding to the second display mode, detecting the change of the orientation corresponding to the second display mode to the orientation corresponding to the first display mode, for presenting the text content on the visual display in the first display mode.

4. The method of claim 1, further comprising, in the orientation corresponding to the first display mode, selecting the one of the at least one of the plurality of visual content indicators for triggering a display of the respective one of the visual contents on the visual display, the selecting comprising at least one of clicking and tapping on the one of the at least one of the visual content indicators presented on the visual display.

5. The method of claim 1, further comprising, in the orientation corresponding to the second display mode, swiping the visual display for introducing a panel comprising the text content for displaying both the text content and the respective one of the visual contents on the visual display.

6. The method of claim 1, wherein the presenting a text content on the visual display comprises presenting a text content comprising a table of contents on the visual display, the table of contents comprising a visual indicator indicative of the existence of visual content.

7. The method of claim 1, further comprising, after presenting the respective one of the visual contents, detecting a swipe on the visual display for navigating between the visual contents.

8. The method of claim 7, further comprising, in the orientation corresponding to the second display mode in which the respective one of the visual contents is displayed, detecting the change of the orientation corresponding to the second display mode to the orientation corresponding to the first display mode, for presenting on the visual display, in the first display mode, the text content which corresponds to the respective one of the visual contents.

9. The method of claim 1, further comprising generating a count of each change of the orientation corresponding to the first display mode to the orientation corresponding to the second display mode, and at least one of: storing the count on the memory and sending the count to a remote server via a communication network.

10. The method of claim 9, further comprising determining a payment based on the count.

11. A portable computing device for controlling an output presented on a visual display, the portable computing device comprising:
   a visual display presenting an output;
   a detector for detecting an orientation of the portable computing device, the orientation corresponding to one of a first display mode and a second display mode;
   a processing device in communication with the visual display and the detector;
   a memory for storing:
   visual contents, each one of the visual contents comprising at least one of graphics data, photo data and video data, and text content substantially comprising text data, the text content further comprising visual content indicators visually associated with respective parts of the text data, each one of the visual content indicators being indicative of the existence of a respective one of the visual contents, the respective one of the visual contents being linked to a respective part of the text data visually associated by at least one of the visual content indicators, wherein the visual content indicators take substantially the same visual form throughout the text content; and
   instructions which cause the processing device:
      to detect the orientation of the portable computing device as corresponding to one of the first display mode and the second display mode;
      in the orientation corresponding to the first display mode, to present the text content without presenting the visual contents and without presenting one or more pictures, photos, and videos, the text content comprising the text data and at least one of the visual content indicators visually associated with at least one of the respective parts of the text data on the visual display, said at least one of the respective parts of the text data each being less than the text data being displayed on said visual display;
      in the presence of one of the at least one of the visual content indicators, to detect a change of the orientation corresponding to the first display mode to the orientation corresponding to the second display mode;
      as a result of the change in orientation, to trigger a loading, from the memory, of the respective one of the visual contents for display in the second display mode; and
      in the orientation corresponding to the second display mode, to present the respective one of the visual contents on the visual display without presenting the text content presented in the first display mode.

12. The portable computing device of claim 11, wherein the detector for detecting an orientation corresponding to one of a first display mode and a second display mode comprises a detector for detecting an orientation corresponding to one of a portrait mode and a landscape mode.

13. The portable computing device of claim 11, wherein the memory is further for storing instructions which cause the processing device to, in the orientation corresponding to the second display mode and upon a swipe on the visual display, display a panel comprising the text content for displaying both the text content and the respective one of the visual contents on the visual display.

14. A non-transitory storage medium comprising processor-readable data and instructions controlling an output presented on a visual display of a portable computing device comprising a memory, the processor-readable data and instructions comprising:
   a detection module for detecting an orientation of the portable computing device, the orientation corresponding to one of a first display mode and a second display mode;
   a text content substantially comprising text data for display when the orientation corresponds to the first display mode without presenting one or more pictures, photos, and videos and without visually presenting visual contents presented in the second display mode;
   visual content indicators presented within the text content and visually associated with respective parts of the text data, each one of the visual content indicators being indicative of the existence of a respective one of the visual contents, each one of the visual contents comprising at least one of graphics data, photo data and video data, said each one of the visual contents being linked to a respective part of the text data visually associated by at least one of the visual content indicators, wherein the visual content indicators take substantially the same visual form throughout the text content; and
   the respective one of the visual contents loaded from the memory and presented without presenting the text content in the first display mode when the detection module detects that the orientation corresponding to the first display mode changes to the orientation corresponding to the second display mode in presence of one of the plurality of the visual content indicators,
   wherein the text content, the visual content indicators and the visual contents are stored on the memory, and said respective parts of the text data each being less than the text data being displayed on said visual display.

15. The non-transitory storage medium of claim 14, wherein the detection module for detecting an orientation corresponding to one of a first display mode and a second display mode comprises a detection module for detecting an orientation being one of a portrait mode and a landscape mode, respectively.

16. The non-transitory storage medium of claim 14, wherein the text content is an electronic book.

17. The non-transitory storage medium of claim 14, wherein the text content further comprises a table of contents, the table of contents comprising at least one of the visual content indicators indicative of the existence of a respective the visual content from the visual contents.

18. The non-transitory storage medium of claim 14, further comprising, when the orientation is detected to correspond to the first display mode, a panel comprising the text content for displaying both the text content and the respective one of the visual contents on the visual display.

* * * * *